United States Patent
Kugumiya et al.

(10) Patent No.: US 7,933,412 B2
(45) Date of Patent: Apr. 26, 2011

(54) IN-VEHICLE COMMUNICATION SYSTEM AND METHOD THEREFOR, IN-VEHICLE COMMUNICATION TERMINAL, COMMUNICATION METHOD THEREFOR, PROGRAM RECORDING MEDIUM, AND PROGRAM

(75) Inventors: Mamoru Kugumiya, Chiba (JP); Keisuke Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 1020 days.

(21) Appl. No.: 11/009,701

(22) Filed: Dec. 10, 2004

(65) Prior Publication Data

US 2005/0177284 A1  Aug. 11, 2005

(30) Foreign Application Priority Data

Dec. 10, 2003  (JP) .................................. 2003-411298

(51) Int. Cl.
*H04K 1/00* (2006.01)
(52) U.S. Cl. ............ 380/258; 380/260; 726/27; 726/28; 726/29
(58) Field of Classification Search .......... 380/200–242; 726/28
See application file for complete search history.

(56) References Cited

U.S. PATENT DOCUMENTS

| | | | |
|---|---|---|---|
| 6,092,193 A * | 7/2000 | Loomis et al. ................ | 713/193 |
| 6,169,728 B1 * | 1/2001 | Perreault et al. ............. | 370/235 |
| 6,212,555 B1 * | 4/2001 | Brooks et al. ................ | 709/219 |
| 6,427,115 B1 * | 7/2002 | Sekiyama ..................... | 701/208 |
| 6,496,928 B1 * | 12/2002 | Deo et al. ..................... | 713/153 |
| 6,574,609 B1 * | 6/2003 | Downs et al. .................. | 705/50 |
| 6,711,474 B1 * | 3/2004 | Treyz et al. ..................... | 701/1 |
| 6,876,642 B1 * | 4/2005 | Adams et al. ................. | 370/338 |
| 6,915,425 B2 * | 7/2005 | Xu et al. ....................... | 713/165 |
| 6,954,714 B2 * | 10/2005 | Suzuki et al. ................. | 702/182 |
| 7,006,481 B2 * | 2/2006 | Terry ............................ | 370/338 |
| 7,099,479 B1 * | 8/2006 | Ishibashi et al. .............. | 380/281 |
| 7,185,363 B1 * | 2/2007 | Narin et al. ........................ | 726/6 |
| 7,200,357 B2 * | 4/2007 | Janik et al. .................... | 455/3.02 |
| 7,203,965 B2 * | 4/2007 | Lakamp et al. ................. | 726/26 |
| 7,231,669 B2 * | 6/2007 | Leung et al. .................... | 726/26 |

(Continued)

FOREIGN PATENT DOCUMENTS

EP  1 128 250 A2  8/2001

(Continued)

OTHER PUBLICATIONS

Wi-Fi Protected Access: Strong, standards-based, interoperable security for today's Wi-Fi networks; Apr. 29, 2003; Wi-Fi Alliance.*

(Continued)

*Primary Examiner* — Edan Orgad
*Assistant Examiner* — James Turchen
(74) *Attorney, Agent, or Firm* — Wolf, Greenfield & Sacks, P.C.

(57) ABSTRACT

Display devices are connected with a content server mounted inside a vehicle by a wireless communication technology as stipulated in IEEE802.11b. The content server and display devices share common keys (encryption key and corresponding decryption key) acted on by key creation information consisting of information about the vehicle. The content server reads out stored contents according to requests from the display devices. The read contents are then encrypted using the encryption key shared with the display devices and sent to the display devices. The invention can be applied to a wireless communication system consisting of devices which communicate data by wireless communication technology within the vehicle.

26 Claims, 26 Drawing Sheets

U.S. PATENT DOCUMENTS

| | | | |
|---|---|---|---|
| 7,251,330 B2 * | 7/2007 | Terao et al. | 380/255 |
| 7,356,832 B1 * | 4/2008 | Eibach et al. | 726/2 |
| 7,472,202 B2 * | 12/2008 | Parupudi et al. | 709/246 |
| 2001/0034714 A1 * | 10/2001 | Terao et al. | 705/57 |
| 2002/0026581 A1 * | 2/2002 | Matsuyama et al. | 713/168 |
| 2002/0076049 A1 * | 6/2002 | Boykin et al. | 380/211 |
| 2003/0045955 A1 * | 3/2003 | Janik | 700/94 |
| 2003/0051159 A1 * | 3/2003 | McCown et al. | 713/201 |
| 2003/0171834 A1 * | 9/2003 | Silvester | 700/94 |
| 2004/0001593 A1 * | 1/2004 | Reinold et al. | 380/277 |
| 2004/0184614 A1 * | 9/2004 | Walker et al. | 380/270 |
| 2004/0202327 A1 * | 10/2004 | Little et al. | 380/270 |
| 2004/0254663 A1 * | 12/2004 | Dame | 700/94 |
| 2005/0187668 A1 * | 8/2005 | Baumgarte | 701/1 |

FOREIGN PATENT DOCUMENTS

| | | |
|---|---|---|
| EP | 1 182 825 A2 | 2/2002 |
| JP | 11-220712 | 8/1999 |
| JP | 2001-236728 | 8/2001 |
| JP | 2002-124960 A | 4/2002 |
| JP | 2003-034661 A | 2/2003 |
| JP | 2003-061205 A | 2/2003 |
| JP | 2003-158460 | 5/2003 |

OTHER PUBLICATIONS

Kazuhiro Miyatsu "Bluetooth Design Background and Its Technological Features" IEICE Trans. Fundamentals, vol. E83, No. 11, Nov. 2000.

* cited by examiner

… (US 7,933,412 B2)

IN-VEHICLE COMMUNICATION SYSTEM AND METHOD THEREFOR, IN-VEHICLE COMMUNICATION TERMINAL, COMMUNICATION METHOD THEREFOR, PROGRAM RECORDING MEDIUM, AND PROGRAM

FIELD OF THE INVENTION

The present invention relates to an in-vehicle communication system, a communication method therefor, an in-vehicle communication terminal, a communication method therefor, a program recording medium, and a program and, more particularly, to in-vehicle communication system, communication method therefor, in-vehicle communication terminal, communication method therefor, program recording medium, and program permitting a network to be used securely and favorably within a vehicle.

BACKGROUND OF THE INVENTION

In the past, where an in-vehicle audio-visual system is mounted, it has been necessary to connect the components by electric wires. Much labor has been required to mount them within a vehicle. Furthermore, by connecting electric wires, limitations are imposed on installation positions. This has made it difficult to create a free in-vehicle space.

On the other hand, it is conceivable that audio-visual devices are connected using wireless communication functions used in the field of personal computers and so on (see Patent Reference 1).

[Patent Reference 1] JP-A-10-32579

However, if the aforementioned wireless communication functions are used for in-vehicle communications, electromagnetic waves leak to the outside of the vehicle, producing the problem of eavesdropping.

SUMMARY OF THE INVENTION

In view of the foregoing circumstances, the present invention has been made. The present invention is intended to permit an in-vehicle network to be used securely and favorably.

An in-vehicle communication system of the present invention is characterized in that it is composed of first and second communication terminals. The first communication terminal has a content readout unit for reading out contents required by the second communication terminal, a content encryption unit for encrypting, using a first key, the contents read out by the content readout unit, and a content transmission unit for sending the contents encrypted by the content encryption unit to the second communication terminal. The first key has been acted on by identification information regarding a vehicle. The second communication terminal has a content reception unit for receiving the contents sent by the first communication terminal, a content decryption unit for decrypting, using the first key, the contents received by the content reception unit, and an output control unit for controlling outputting of the contents decrypted by the content decryption unit.

The identification information can be production number of the vehicle, plate number of the vehicle, engine key number, or user's driver's license number.

The first communication terminal can further include an identification information reception unit for receiving the identification information sent from the second communication terminal, a creation unit for creating the first key by acting on the identification information received by the identification information reception unit, and a key transmission unit for sending the first key created by the creation unit to the second communication terminal. The second communication terminal can further include an input unit for entering identification information based on a user's operation, an input decision unit for making a decision as to whether transmission of the identification information entered by the input unit has been commanded, a position decision unit for making a decision as to whether the first communication terminal is located within a given close region, an identification information transmission unit for sending the identification information to the first communication terminal in a case where the input decision unit has determined that transmission of the identification information has been commanded and, at the same time, the position decision unit has determined that the first communication terminal is located within the given close range, and a key reception unit for receiving the first key sent in from the first communication terminal.

The first communication terminal can further include an identification information storage unit for previously storing identification information and a first creation unit for creating the first key by acting on the identification information stored in the identification information storage unit. The second communication terminal can further include an input unit for entering the identification information based on a user's operation and a second creation unit for creating the first key by acting on the identification information entered by the input unit.

The first communication terminal can further include a first key storage unit for previously storing a second key used for encryption, an identification information decryption unit for decrypting the identification information from the second communication terminal using the second key, and a first rewriting unit for rewriting the second key stored in the first key storage unit into a first key acted on by the identification information decrypted by the identification information decryption unit. The second communication terminal can further include a second key storage unit for previously storing the second key, an input unit for entering the identification information based on a user's operation, an identification information encryption unit for encrypting the identification information entered by the input unit using the second key, an identification information transmission unit for sending the identification information encrypted by the identification information encryption unit to the first communication terminal, and a second rewriting unit for rewriting the second key stored in the key storage unit into the first key acted on by the identification information entered by the input unit. Before the second key is rewritten into the first key by the first and second rewriting units, the content encryption unit and content decryption unit process the contents using the second key. After the second key has been rewritten into the first key by the first and second rewriting units, the encryption unit and content decryption unit process the contents using the first key.

The first communication terminal can further include a user identification information reception unit for receiving user-specific identification information from the second communication terminal, a creation unit for creating the first key by acting on the user-specific identification information received by the user identification information reception unit, and a content limitation unit for limiting contents read out by the content readout unit based on the user-specific identification information received by the user identification information reception unit. The second communication terminal can further include a user information readout unit for reading out user's information from a recording medium installed in the second communication terminal itself, an identification information readout unit for reading out the user-specific identification information from a memory based on the user's information read out by the user information readout unit, and an identification information transmission unit for sending the user-specific identification information read out by the identification information readout unit to the first communication terminal.

The first communication terminal can further include a calculation unit for calculating the total of transfer rates of contents communicated with the second communication terminal, a capability decision unit for making a decision as to whether the total of transfer rates calculated by the calculation unit exceeds the transfer capability of the wireless network, and a transfer rate change unit for changing the transfer rates of the contents sent by the content transmission unit according to the priorities of the contents in a case where the capability decision unit has determined that the total of the transfer rates exceeds the transfer capability of the wireless network.

The first communication terminal can further include a volume measurement unit for measuring the data volume of the contents sent by the content transmission unit. The calculation unit can calculate the total of the transfer rates of contents communicated with the second communication terminal based on information about the data volume measured by the volume measurement unit.

The first communication terminal can further include a data information reception unit for receiving information about data volume sent from the second communication terminal. The calculation unit calculates the total of transfer rates of contents communicated with the second communication terminal based on the information about the data volume received by the data information reception unit. The second communication terminal can further include a volume measurement unit for measuring the data volume of the contents received by the content reception unit and a data information transmission unit for sending information about the data volume measured by the volume measurement unit to the first communication terminal.

In a first communication method of the present invention, the first communication terminal performs communications by reading out contents required by the second communication terminal, encrypting the read contents using a key acted on by identification information about a vehicle, and sending the encrypted contents to the second communication terminal. The second communication terminal performs communications by receiving the contents sent from the first communication terminal, decrypting the received contents using the key, and controlling outputting of the decrypted contents.

A first in-vehicle communication terminal of the present invention has a content readout unit for reading out contents required by other second in-vehicle communication terminal, a content encryption unit for encrypting the contents read out by the content readout unit using a first key acted on by the identification information about the vehicle, and a content transmission unit for sending the contents encrypted by the content encryption unit to the second in-vehicle communication terminal.

The identification information can be production number of the vehicle, plate number of the vehicle, engine key number, or user's driver's license number.

It is also possible to include an identification information reception unit for receiving identification information sent from the other second in-vehicle communication terminal disposed in a given close range, a creation unit for creating the first key based on the identification information received by the identification information reception unit, and a key transmission unit for sending the first key created by the creation unit to the second in-vehicle communication terminal.

It is also possible to further include an identification information storage unit for previously storing identification information and a creation unit for creating the first key based on the identification information stored in the identification information storage unit.

It is also possible to further include a key storage unit for previously storing a second key used for encryption, an identification information reception unit for receiving the identification information which has been encrypted using the second key and which has been sent by the second in-vehicle communication terminal, an identification information decryption unit for decrypting the identification information received by the identification information reception unit using the second key, and a rewriting unit for rewriting the second key stored in the key storage unit into the first key acted on by the identification information decrypted by the identification information decryption unit. Before the second key is rewritten into the first key by the rewriting unit, the content encryption unit encrypts the contents using the second key. After the second key has been rewritten into the first key by the rewriting unit, the content encryption unit encrypts the contents using the first key.

It is also possible to further include a user identification information reception unit for receiving user-specific identification information from the other second in-vehicle communication terminal, a creation unit for creating the first key by acting on the user-specific identification information received by the user identification information reception unit, and a content limitation unit for limiting contents read out by the content readout unit based on the user-specific identification information received by the user identification information reception unit.

It is also possible to further include a calculation unit for calculating the total of transfer rates of contents communicated with the other second in-vehicle communication terminal, a capability decision unit for making a decision as to whether the total of transfer rates calculated by the calculation unit has exceeded the transfer capability of the wireless network, and a transfer rate change unit for changing the transfer rates of contents sent by the content transmission unit according to the priorities of the contents in a case where the capability decision unit has determined that the total of the transfer rates has exceeded the transfer capability of the wireless network.

It is also possible to further include a volume measurement unit for measuring the data volume of contents sent by the content transmission unit. The calculation unit can calculate the total of transfer rates of contents communicated with the second in-vehicle communication terminal based on information about the data volume measured by the volume measurement unit.

It is also possible to further include a data information reception unit for receiving information about the data volume of contents which are measured and sent by the second in-vehicle communication terminal that has received the contents sent by the content transmission unit. The calculation unit can calculate the total of transfer rates of contents communicated with the second in-vehicle communication terminal based on the information about the data volume received by the data information reception unit.

A second communication method of the present invention comprises the steps of: reading out contents required from other in-vehicle communication terminal, encrypting the read contents using a key acted on by identification information about a vehicle, and sending the encrypted contents to the other in-vehicle communication terminal.

A program recording medium on which a first program of the present invention is recorded comprises the steps of: reading out contents required from an in-vehicle communication terminal, encrypting the read contents using a key acted on by identification information about a vehicle, and sending the encrypted contents to the in-vehicle communication terminal.

The first program of the invention comprises the steps of: reading out contents required from an in-vehicle communication terminal, encrypting the read contents using a key acted on by identification information about a vehicle, and sending the encrypted contents to the in-vehicle communication terminal.

A second in-vehicle communication terminal of the invention comprises a content reception unit for receiving contents encrypted and sent by other in-vehicle communication terminal using a first key acted on by identification information about a vehicle, a content decryption unit for decrypting the contents received by the content decryption unit using the first key, and an output control unit for controlling outputting of the contents decrypted by the content decryption unit.

The identification information can be production number of the vehicle, plate number of the vehicle, engine key number, or user's driver's license number.

The following units can be further included: an input unit for entering identification information based on a user's operation; an input decision unit for making a decision as to whether transmission of the identification information entered from the input unit has been commanded; a position decision unit for making a decision as to whether other in-vehicle communication terminal is located within a given close range; an identification information transmission unit for sending the identification information to the other in-vehicle communication terminal in a case where the input decision unit has determined that transmission of the identification information has been commanded and, at the same time, the position decision unit has determined that the other in-vehicle communication terminal is located within the given close range; and a key reception unit for receiving a first key which has been created by acting on the identification information and which has been sent by the other in-vehicle communication terminal.

It is also possible to further include an input unit for entering the identification information based on a user's operation and a creation unit for creating the first key based on the identification information entered by the input unit.

It is also possible to further include a key storage unit for previously storing a second key used for encryption, an input unit for entering the identification information based on a user's operation, an identification information encryption unit for encrypting the identification information entered by the input unit using a second key, an identification information transmission unit for sending the identification information encrypted by the identification information encryption unit to other in-vehicle communication terminal, and a rewriting unit for rewriting the second key stored in the key storage unit into the first key acted on by the identification information entered by the input unit. Before the second key is rewritten into the first key by the rewriting unit, the content decryption unit can decrypt the contents using the second key. After the second key has been rewritten into the first key by the rewriting unit, the content decryption unit can decrypt the contents using the first key.

It is also possible to further include a user information readout unit for reading out user's information from the recording medium installed in this terminal, an information readout unit for reading out user-specific identification information for identifying the user from a memory based on the user's information read out by the user information readout unit, and an identification information transmission unit for sending the user-specific identification information read out by the information readout unit to other in-vehicle communication terminal. The content reception unit can receive only contents whose readouts are not limited as a result of an authentication performed by the other in-vehicle communication terminal based on the user-specific identification information.

It is also possible to further include a volume measurement unit for measuring the data volume of the contents received by the content reception unit and a data information transmission unit for sending information about the data volume measured by the volume measurement unit to other in-vehicle communication terminal. The content reception unit can receive the contents whose transfer rates have been changed based on the information about the data volume by the other in-vehicle communication terminal.

A third communication method of the present invention comprises the steps of: receiving contents encrypted and sent by other in-vehicle communication terminal using a key acted on by identification information about a vehicle; decrypting the received contents using the key; and controlling outputting of the contents decrypted by the content decryption unit.

A program recording medium on which a second program of the present invention is recorded comprises the steps of: receiving contents encrypted and sent by an in-vehicle communication terminal using a key acted on by identification information about a vehicle; decrypting the received contents using the key; and controlling outputting of the contents decrypted by a content decryption unit.

A second program of the invention comprises the steps of: receiving contents encrypted and sent by an in-vehicle communication terminal using a key acted on by identification information about a vehicle; decrypting the received contents using the key; and controlling outputting of the contents decrypted by a content decryption unit.

In a first aspect of the present invention, contents required by the second communication terminal are read out by the first communication terminal and communication method. The contents read out are encrypted using the key acted on by the identification information about the vehicle. The encrypted contents are sent to the second communication terminal. The contents sent by the first communication terminal are received by the second communication terminal and communication method. The received contents are decrypted using the key. Outputting of the decrypted contents is controlled.

In a second aspect of the invention, contents required by an in-vehicle communication terminal are read out and then encrypted using the key acted on by identification information about the vehicle. The encrypted contents are sent to the in-vehicle communication terminal.

In a third aspect of the invention, contents encrypted and sent by other in-vehicle communication terminal are received using the key acted on by the identification information about the vehicle. The received contents are decrypted using the key. Outputting of the decrypted contents is controlled.

A network is a mechanism in which at least two devices are connected with wires or wirelessly such that information can be conveyed from one device to others. Devices that perform communications via a network may be independent of each other or may be internal blocks forming one device or apparatus.

Communications include wireless communications and wired communications. In addition, communications may include mixed communications environments in which wireless and wired communications are mixed. That is, wireless communications are performed in one interval, while wired communications are performed in other intervals. Moreover, communication from a first device to a second device may be carried out with wire. Communication from the second device to the first device may be done wirelessly.

According to the present invention, the network within the vehicle can be used securely and favorably. Additionally, according to the invention, the network can be used efficiently and adequately for the in-vehicle environment.

DESCRIPTION OF THE PREFERRED EMBODIMENTS

Embodiments of the present invention are hereinafter described. An example of corresponding relationship between the constituent elements recited in claims and specific examples of the embodiments is described. This description permits one to recognize that specific examples that support embodiments of the invention recited in the claims are described in the embodiments of the invention that follow. Accordingly, if there are specific examples which are described in the embodiments of the invention but not described herein as ones corresponding to constituent elements, it does not mean that the specific examples do not correspond to the constituent elements. Inversely, if the specific examples are described herein as ones corresponding to the constituent elements, it does not mean that the specific examples do not correspond to constituent elements other than those constituent elements.

Furthermore, it does not mean that aspects of the invention corresponding to specific examples described in the embodiments of the invention that follow are all described in the attached claims. In other words, the description recites aspects of the invention corresponding to specific examples described in the embodiments of the invention that follow. Existence of aspects of the invention not described in the claims of the present application is not denied. That is, the present application might be filed as a divisional application in the future, or aspects of the invention might be added by an amendment.

Figure 1:
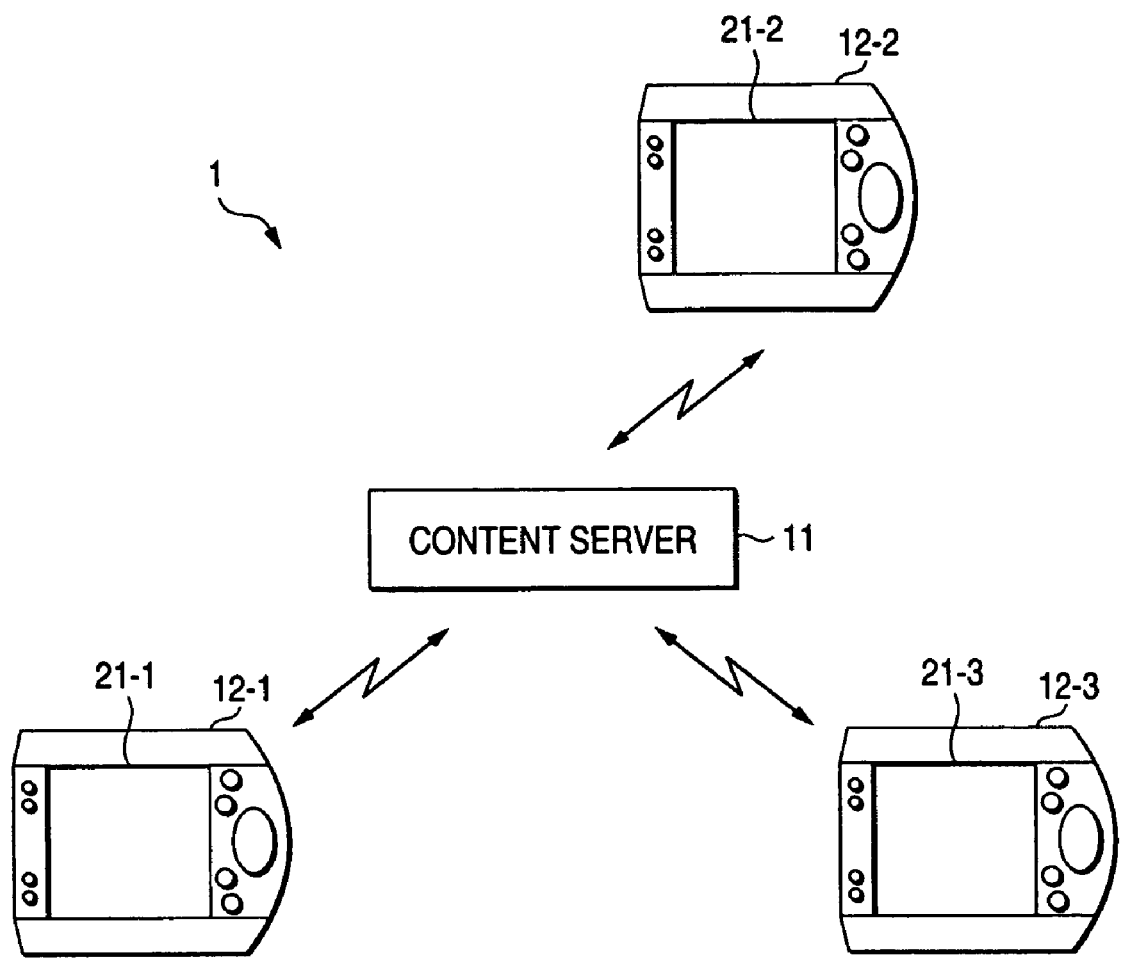
FIG. 1 is a diagram showing an example of configuration of wireless communication system of the present invention.

An in-vehicle communication system according to a first aspect of the present invention (e.g., a wireless communication system 1 of FIG. 1) has a first communication terminal (such as content server 11 of FIG. 1). This first communication terminal has a content readout unit (such as receiver portion 42 of FIG. 2 that carries out the processing of step S41 of FIG. 7) for reading out contents required by a second communication terminal, a content encryption unit (such as encryption portion 32 of FIG. 2) for encrypting the contents read out by the content readout unit using a first key acted on by identification information (such as information 71 for creation of a key as shown in FIG. 3) about a vehicle, and a content transmission unit (such as sender portion 41 of FIG. 2 for carrying out the processing of step S43 of FIG. 7) for sending the contents encrypted by the content encryption unit to the second communication terminal. The second communication terminal such as a display device 12-1 of FIG. 1 has a content reception unit (such as receiver portion 62 of FIG. 3) for receiving the contents sent from the first communication terminal, a content decryption unit (such as decryption portion 52 of FIG. 3) for decrypting the contents received by the content reception unit using the first key, and an output control unit (such as display control portion 54 of FIG. 3) for controlling outputting of the contents decrypted by the content decryption unit.

An in-vehicle communication system according to a third aspect of the present invention has the first communication terminal. This first communication terminal further includes an identification information reception unit (such as receiver portion 42 of FIG. 2 for carrying out the processing of step S14 of FIG. 5) for receiving identification information (such as information 71 for creation of a key as shown in FIG. 3), the identification information being sent from the second communication terminal, a creation unit (such as key creation portion 34 of FIG. 2) for creating the first key by acting on the identification information received by the identification information reception unit, and a key transmission unit (such as sender portion 41 of FIG. 2 for carrying out the processing of step S16 of FIG. 5) for sending the first key created by the creation unit to the second communication terminal. The second communication terminal further includes an input unit (such as operation input portion 55 of FIG. 3) for entering the identification information based on a user's operation, an input decision unit (such as sender portion 61 of FIG. 3 to perform processing of step S3 of FIG. 4) for making a decision as to whether transmission of the identification information entered by the input unit has been commanded, a position decision unit (such as receiver portion 62 of FIG. 3 for carrying out the processing of step S5 of FIG. 5) for making a decision as to whether the first communication terminal is located within a given close range, an identification information transmission unit (such as sender portion 61 of FIG. 3 for carrying out the processing of step S6 of FIG. 5) for sending the identification information to the first communication terminal in a case where the input decision unit has determined that transmission of the identification information has been commanded and, at the same time, the position decision unit has determined that the first communication terminal is located in the given close range, and a key reception unit (such as receiver portion 62 of FIG. 3 for carrying out the processing of step S7 of FIG. 5) for receiving the first key sent in from the first communication terminal.

Figure 8:
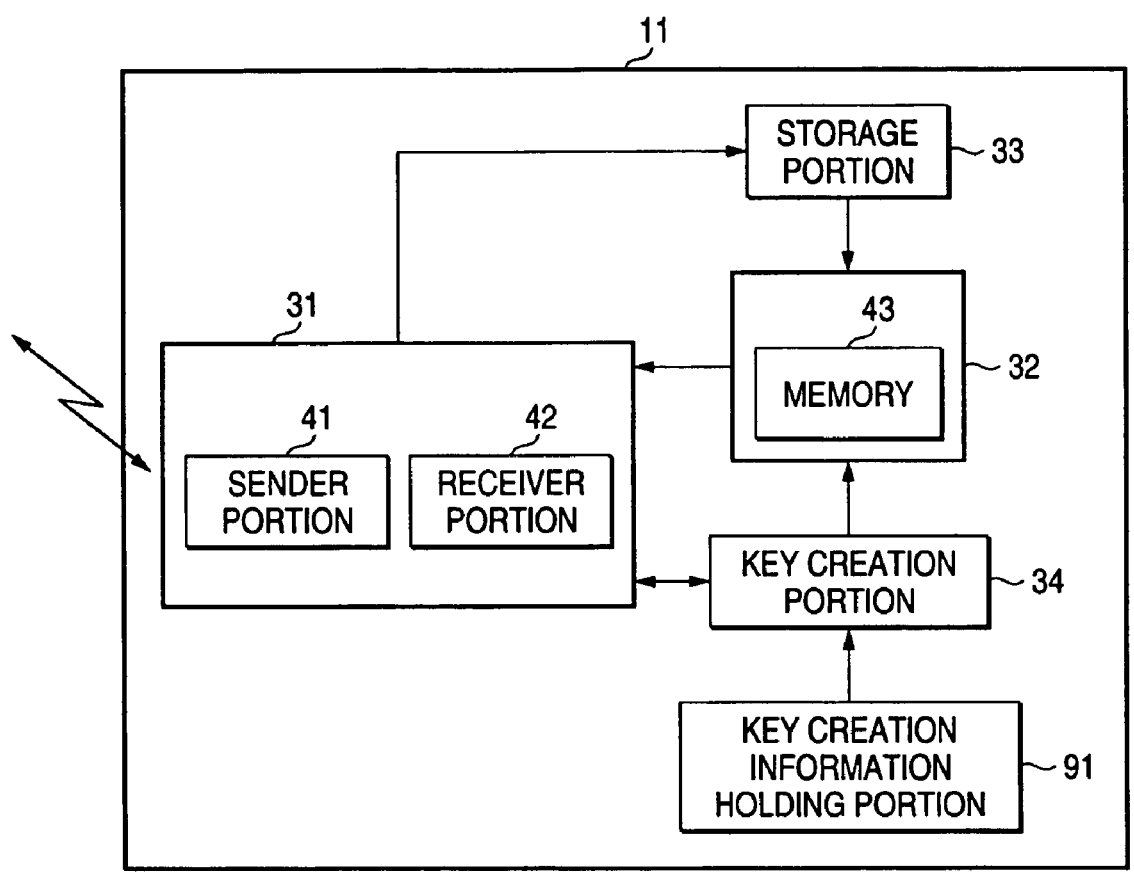
FIG. 8 is a block diagram showing another example of configuration of the content server of FIG. 1.
Figure 9:
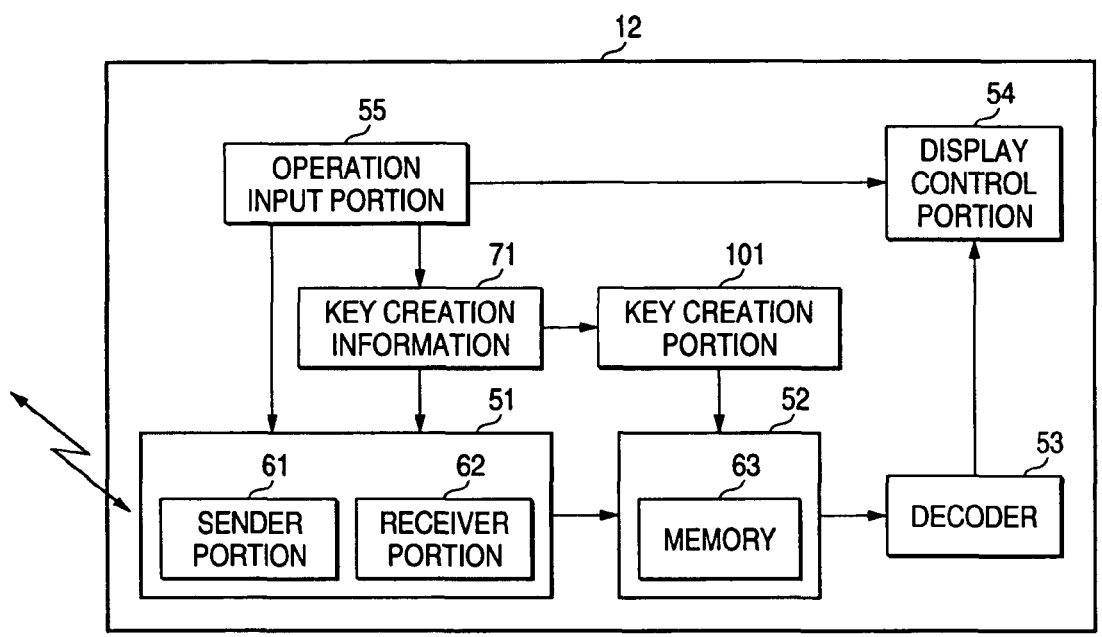
FIG. 9 is a block diagram showing another example of configuration of the display device of FIG. 1.

An in-vehicle communication system according to a fourth aspect of the invention has the first communication terminal such as content server 11 of FIG. 8. The first communication terminal further includes an identification information storage unit (such as key creation information holding portion 91 of FIG. 8) for previously storing the identification information and a first creation unit (such as key creation portion 34 of FIG. 8) for creating the first key by acting on the identification information stored in the identification information storage unit. The second communication terminal such as display device 12 of FIG. 9 further includes an input unit (such as operation input portion 55 of FIG. 9) for entering the identification information (such as information 71 for creation of a key as shown in FIG. 9) based on a user's operation and a second creation unit (such as key creation portion 101 of FIG. 9) for creating the first key by acting on the identification information entered from the input unit.

Figure 10:
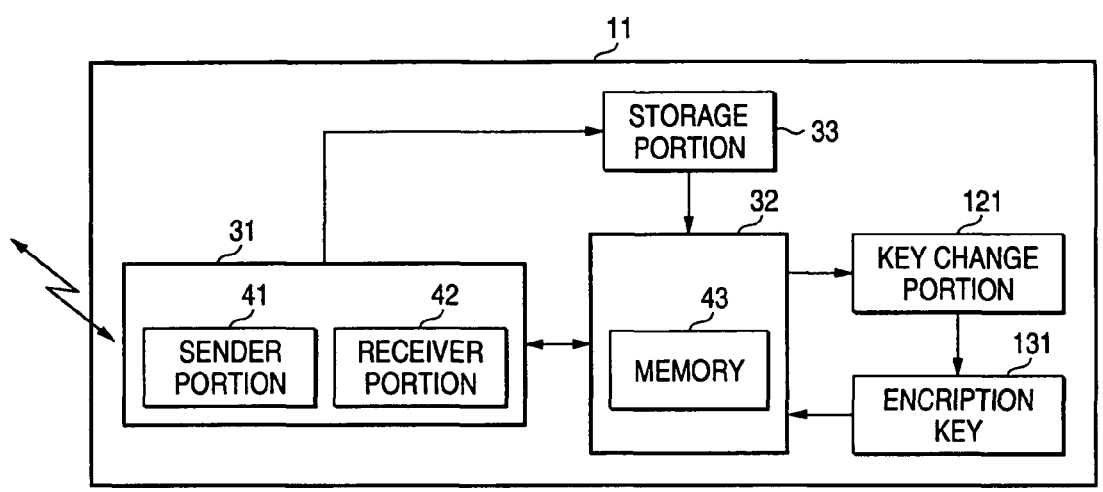
FIG. 10 is a block diagram showing a further example of configuration of the content server of FIG. 1.

An in-vehicle communication system according to a fifth aspect of the present invention has the first communication terminal (such as content server 11 of FIG. 10). The first terminal further includes a first key storage unit (such as memory 43 of FIG. 10) for previously storing a second key used for encryption, an identification information decryption unit (such as encryption portion 32 of FIG. 10 for carrying out the processing of step S122 of FIG. 13) for decrypting the identification information from the second communication terminal using the second key, and a first rewriting unit (such as key change portion 121 of FIG. 10) for rewriting the second key stored in the first key storage unit into the first key (such as encryption key 131 of FIG. 10) acted on by the identification information decrypted by the identification information decryption unit. The second communication terminal (such as display device 12 of FIG. 11) further includes a second key storage unit (such as memory 63 of FIG. 11) for previously storing the second key, an input unit (such as operation input portion 55 of FIG. 11) for entering the identification information based on a user's information, an input unit (such as operation input portion 55 of FIG. 11) for entering identification information based on a user's operation, an identification information encryption unit (such as encryption portion 142 of FIG. 11) for encrypting the identification information entered by the input unit using the second key, an identification information transmission unit (such as sender portion 61 of FIG. 11) for sending the identification information encrypted by the identification information encryption unit to the first communication terminal, and a second rewriting unit (such as key change portion 141 of FIG. 11) for rewriting the second key stored in the key storage unit into the first key (such as encryption key 151 of FIG. 11) acted on by the identification information entered from the input unit. Before the second key is rewritten into the first key by the first and second rewriting units, the content encryption unit (such as encryption portion 32 of FIG. 10) and content decryption unit (such as encryption unit 142 of FIG. 11) process the contents using the second key. After the second key has been rewritten into the first key by the first and second rewriting units, the contents are processed using the first key.

Figure 14:
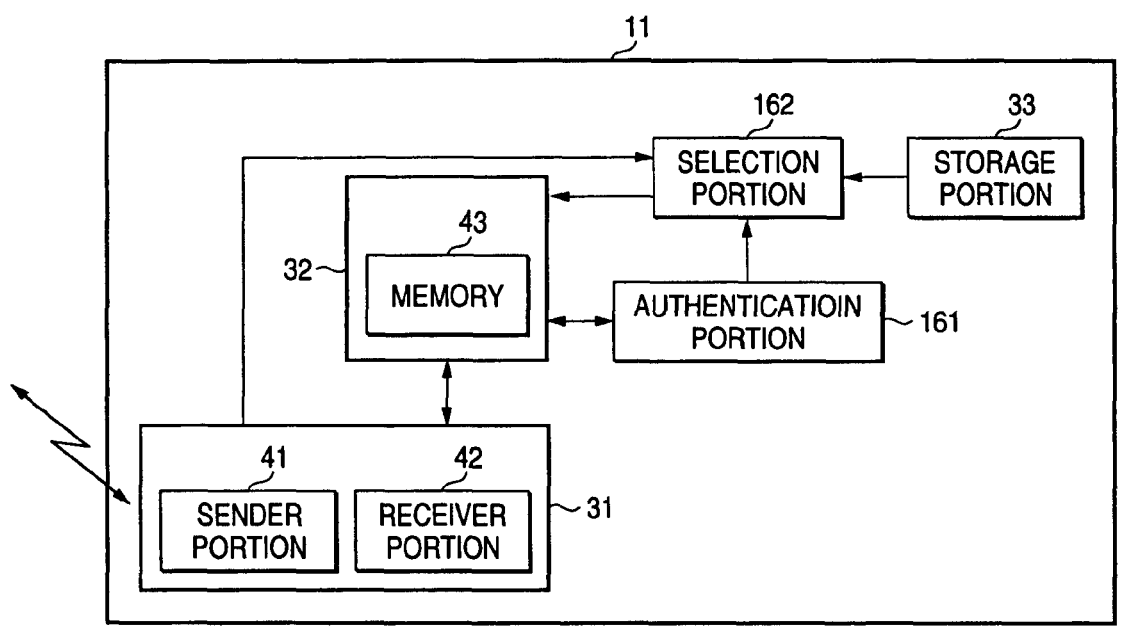
FIG. 14 is a block diagram showing a further example of configuration of the content server of FIG. 1.

An in-vehicle communication system according to a sixth aspect of the present invention has the first communication terminal (such as content server 11 of FIG. 14). The first communication terminal further includes a user identification information reception unit (such as receiver portion 42 of FIG. 14 for carrying out the processing of step S171 of FIG. 17) for receiving user-specific identification information from the second communication terminal, a creation unit (such as encryption portion 32 of FIG. 14 for carrying out the processing of step S174 of FIG. 17) for creating the first key by acting on the user-specific identification information received by the user identification information reception unit, and a content limitation unit (such as selection portion 162 of FIG. 14) for limiting the contents read out by the content readout unit based on the user-specific identification information received from the user identification information reception unit. The second communication terminal (such as display device 12 of FIG. 15) further includes a user information readout unit (such as card reader 181 of FIG. 15) for reading out user's information from a recording medium (such as card 171 of FIG. 15) mounted in the second communication terminal itself, an identification information readout unit (such as authentication portion 182 of FIG. 15) for reading out user-specific identification information from a memory based on the user's information read out by the user information readout unit and an identification information transmission unit (such as sender portion 61 of FIG. 15 for carrying out the processing of step S155 of FIG. 16) for sending the user-specific identification information read out by the identification information readout unit to the first communication terminal.

Figure 18:
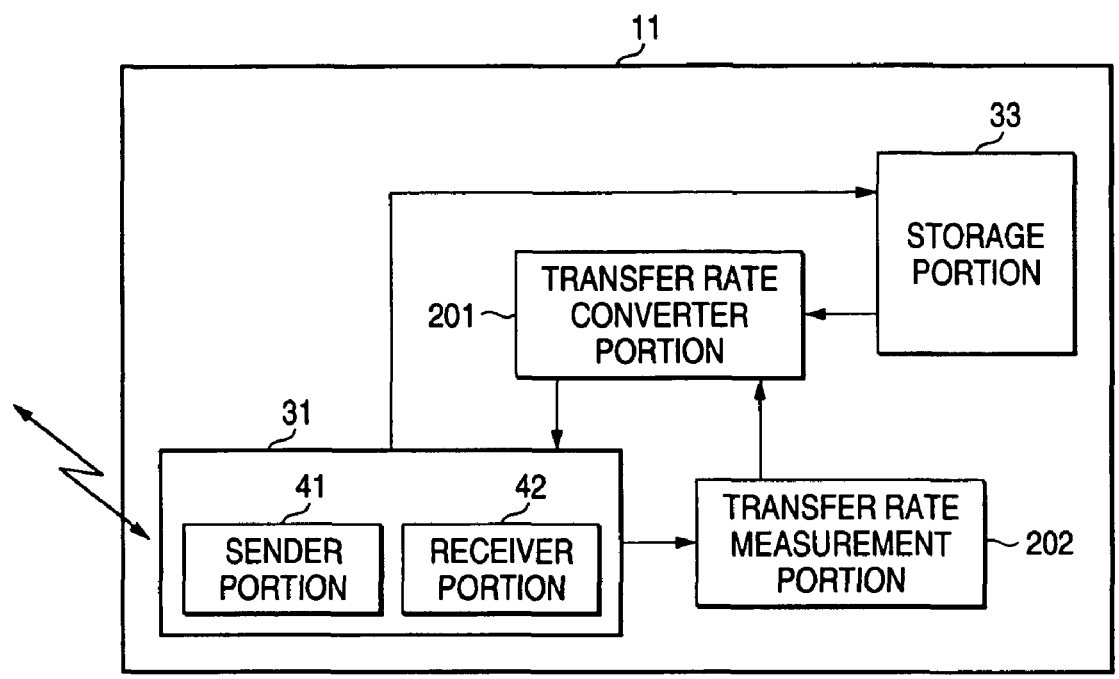
FIG. 18 is a block diagram showing a still other example of configuration of the content server of FIG. 1.

An in-vehicle communication system according to a seventh aspect of the invention has the first communication terminal (such as content server 11 of FIG. 18). This first communication terminal further includes a calculation unit (such as transfer rate measurement portion 202 of FIG. 18 for carrying out the processing of step S203 of FIG. 20) for calculating the total of transfer rates of contents communicated with the second communication terminal, a capability decision unit (such as transfer rate measurement portion 202 of FIG. 18 for carrying out the processing of step S204 of FIG. 20) for making a decision as to whether the total of transfer rates calculated by the calculation unit has exceeded the transfer capability of the wireless network, and a transfer rate change unit (such as transfer rate converter portion 201 of FIG. 18) for modifying the transfer rates of the contents sent by the content transmission portion according to the priorities of the contents in a case where the capability decision unit has determined that the total of the transfer rates has exceeded the transfer capability of the wireless network.

An in-vehicle communication system according to an eighth aspect of the present invention has the first communication terminal which further includes a volume measurement unit (such as transfer rate measurement portion 202 of FIG. 18 for carrying out the processing of step S202 of FIG. 20) for measuring the data volume of the contents sent by the content transmission unit. The calculation unit calculates the total of the transfer rates of the contents communicated with the second communication terminal based on information about the data volume measured by the volume measurement unit.

Figure 22:
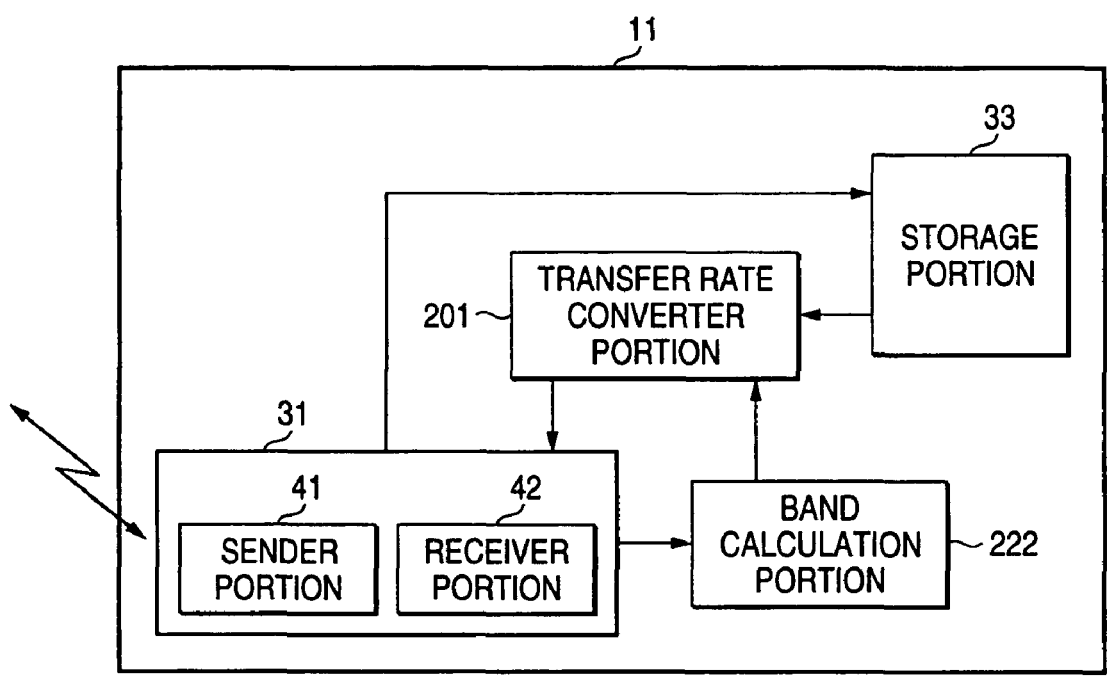
FIG. 22 is a block diagram showing a further example of configuration of the content server of FIG. 1.

An in-vehicle communication system according to a ninth aspect of the present invention has a first communication terminal (such as content server 11 of FIG. 22). This first communication terminal further includes a data information reception unit (such as receiver portion 42 of FIG. 22) for receiving information about the data volume sent from the second communication terminal. The calculation unit (such as band calculation portion 222 of FIG. 22) calculates the total of the transfer rates of the contents communicated with the second communication terminal based on the information about the data volume received from the data information reception unit. The second communication terminal (such as display device 12 of FIG. 23) further includes a volume measurement unit (such as data measurement portion 241 of FIG. 23) for measuring the data volume of the contents received by the content reception unit, and a data information transmission unit (such as sender portion 61 of FIG. 23) for sending the information about the data volume measured by the volume measurement unit to the first communication terminal.

Figure 7:
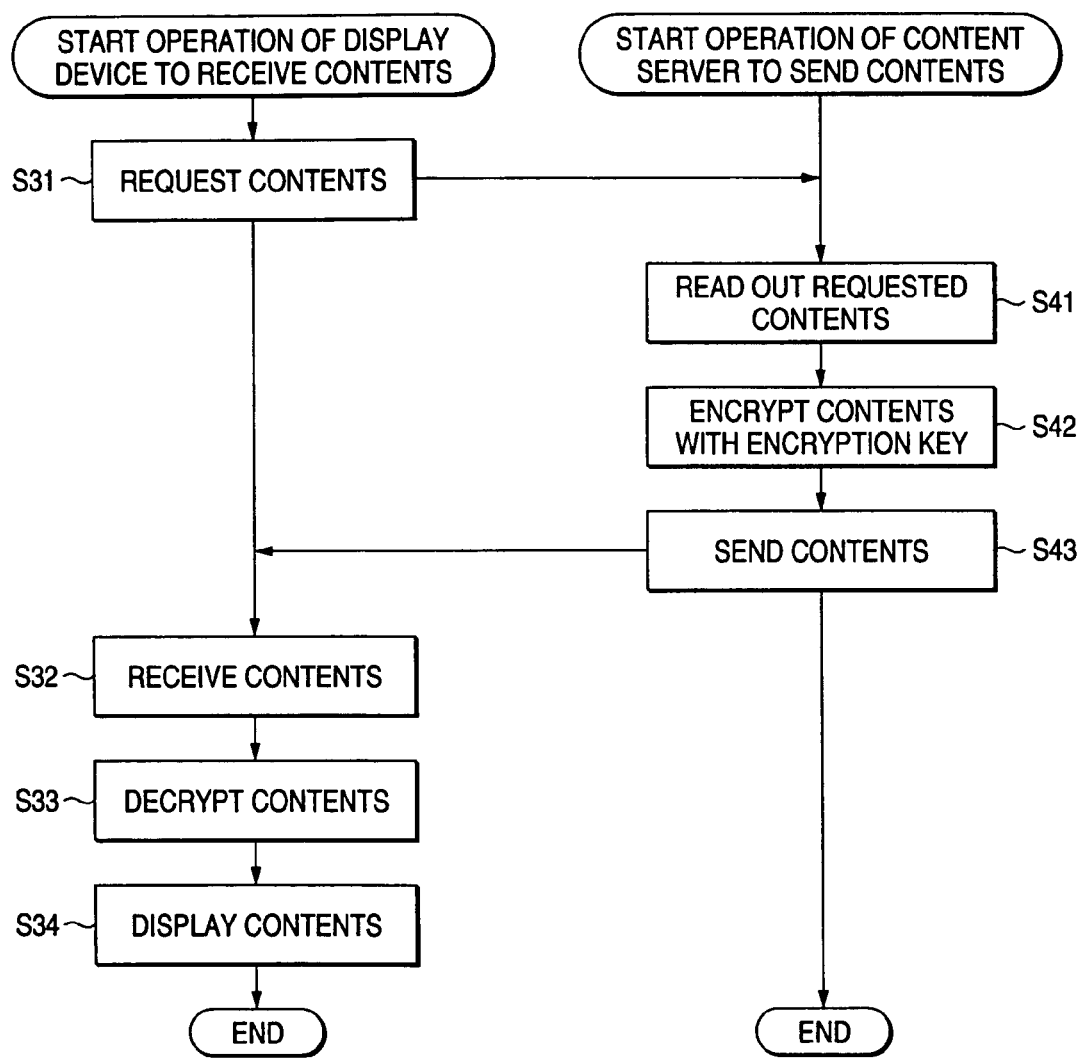
FIG. 7 is a flowchart illustrating processing (operation) of the wireless communication system of FIG. 1 to send and receive contents.

In a communication method according to a tenth aspect of the present invention, a first communication terminal performs communications by reading out (such as step S41 of FIG. 7) contents required by a second communication terminal, encrypting the read contents (such as step S42 of FIG. 7) using a key acted on by identification information about a vehicle, and sending the encrypted contents to the second communication terminal (such as step S43 of FIG. 7). The second communication terminal performs communications by receiving the contents sent from the first communication terminal (such as step S32 of FIG. 7), decrypting the received contents (such as step S33 of FIG. 7) using a key, and controlling outputting of the decrypted contents (such as step S34 of FIG. 7).

An in-vehicle communication terminal (such as content server 11 of FIG. 1) according to an eleventh aspect of the present invention has a content readout unit (such as receiver portion 42 of FIG. 2 for carrying out the processing of step S41 of FIG. 7) for reading out contents required by other in-vehicle communication terminal (such as display device 12-1 of FIG. 1), a content encryption unit (such as encryption portion 32 of FIG. 2) for encrypting the contents read out by the content readout unit using a first key acted on by identification information (such as key creation information 71 of FIG. 3) about a vehicle, and a content transmission unit (such as sender portion 41 of FIG. 2 for carrying out the processing of step S43 of FIG. 7) for sending the contents encrypted by the content encryption unit to the other in-vehicle communication terminal.

An in-vehicle communication terminal according to a thirteenth aspect of the present invention further includes an identification information reception unit (such as receiver portion 42 of FIG. 2 for carrying out the processing of step S14 of FIG. 5) for receiving identification information (such as information 71 (FIG. 3) for creation of a key) received from other in-vehicle communication terminal located within a given close range, a creation unit (such as key creation portion 34 of FIG. 2) for creating a first key based on the identification information received by the identification information reception unit, and a key transmission unit (such as sender portion 41 of FIG. 2 for carrying out the processing of step S16 of FIG. 5) for sending the first key created by the creation unit to the other in-vehicle communication terminal.

An in-vehicle communication terminal (such as content server 11 of FIG. 8) according to a fourteenth aspect of the present invention further includes an identification information storage unit (such as key creation information holding portion 91 of FIG. 8) for previously storing identification information and a creation unit (such as key creation portion 34 of FIG. 8) for creating the first key based on the identification information stored in the identification information storage unit.

An in-vehicle communication terminal (such as content server 11 of FIG. 10) according to a fifteenth aspect of the present invention further includes a key storage unit (such as memory 43 of FIG. 10) for previously storing a second key used for encryption, an identification information reception unit (such as receiver portion 42 of FIG. 10 for carrying out the processing of step S121 of FIG. 13) for receiving the identification information which has been encrypted using the second key from other in-vehicle communication terminal and which has been sent, an identification information decryption unit (such as encryption portion 32 of FIG. 10 for carrying out the processing of step S122 of FIG. 13) for decrypting the identification information received by the identification information reception unit using the second key, and a rewriting unit (such as key change portion 121 of FIG. 10) for rewriting the second key stored in the key storage unit into the first key (such as encryption key 131 of FIG. 10) acted on by the identification information decrypted by the identification information decryption unit. The content encryption unit (such as encryption portion 32 of FIG. 10) encrypts the contents using the second key before the second key is rewritten into the first key by the rewriting unit, and encrypts the contents using the first key after the second key has been rewritten into the first key by the rewriting unit.

An in-vehicle communication terminal (such as content server 11 of FIG. 14) according to a sixteenth aspect of the present invention further includes a user identification information reception unit (such as receiver portion 42 of FIG. 14 for carrying out the processing of step S171 of FIG. 17) for receiving user-specific identification information from other in-vehicle communication terminal (such as display device 12 of FIG. 15), a creation unit (such as encryption portion 32 of FIG. 14 for carrying out the processing of step S174 of FIG. 17) for creating the first key by acting on the user-specific identification information received by the user identification information reception unit, and a content limitation unit (such as selection portion 162 of FIG. 14) for limiting the contents read out by the content readout unit based on the user-specific identification information received by the user identification information reception unit.

An in-vehicle communication terminal (such as content server 11 of FIG. 18) according to a seventeenth aspect of the present invention further includes a calculation unit (such as transfer rate measurement portion 202 of FIG. 18 for carrying out the processing of step S203 of FIG. 20) for calculating the total of transfer rates of contents communicated with the other in-vehicle communication terminal, a capability decision unit (such as transfer rate measurement portion 202 of FIG. 18 for carrying out the processing of step S204 of FIG. 20) for making a decision as to whether the total of transfer rates calculated by the calculation unit has exceeded the transfer capability of the wireless network, and a transfer rate change unit (such as transfer rate converter portion 201 of FIG. 18) for modifying the transfer rates of contents sent by the content transmission unit according to the priorities of the contents in a case where the capability decision unit has determined that the total of the transfer rates has exceeded the transfer capability of the wireless network.

An in-vehicle communication terminal according to an eighteenth aspect of the present invention further includes a volume measurement unit (such as transfer rate measurement portion 202 of FIG. 18 for executing the processing of step S202 of FIG. 20) for measuring the data volume of contents sent by the content transmission unit. The calculation unit calculates the total of transfer rates of contents communicated with the other in-vehicle communication terminal based on information about the data volume measured by the volume measurement unit.

An in-vehicle communication terminal (such as content server 11 of FIG. 22) according to a nineteenth aspect of the present invention further includes a data information reception unit (such as receiver portion 42 of FIG. 22 for carrying out the processing of step S242 of FIG. 24) for receiving information about the data volume of contents sent and measured by the other in-vehicle communication terminal that has received the contents sent by the content transmission unit. The calculation unit (such as band calculation portion 222 of FIG. 22) calculates the total of transfer rates of the contents communicated with the other in-vehicle communication terminal based on information about the data volume received by the data information reception unit.

A communication method according to a twentieth aspect of the present invention comprises the steps of: reading out contents (such as step S41 of FIG. 7) required by other in-vehicle communication terminal; encrypting the read contents (such as step S42 of FIG. 7) using a key acted on by identification information about a vehicle; and sending the encrypted contents (such as step S43 of FIG. 7) to the other in-vehicle communication terminal.

Since program recording medium according to a twenty-first aspect of the present invention and program according to a twenty-second aspect are fundamentally identical in configuration with the communication method according to the twentieth aspect, their description is omitted to prevent repetition of the same description.

An in-vehicle communication terminal (such as display device 12-1 of FIG. 1) according to a twenty-third aspect of the present invention has a content reception unit (such as receiver portion 62 of FIG. 3 for carrying out the processing of step S32 of FIG. 7) for receiving contents which have been encrypted by other in-vehicle communication terminal (such as content server 11 of FIG. 1) using a first key acted on by identification information (such as information 71 (FIG. 3)) for creation of a key) about a vehicle and which have been sent, a content decryption unit (such as decryption portion 52 of FIG. 3 for carrying out the processing of step S33 of FIG. 7) for decrypting the contents received by the content reception unit using the first key, and an output control unit (such as display control portion 54 of FIG. 3) for controlling outputting of the contents decrypted by the content decryption unit.

An in-vehicle communication terminal (such as display device 12 of FIG. 3) according to a twenty-fifth aspect of the present invention further includes an input unit (such as operation input portion 55 of FIG. 3) for entering identification information (such as information 71 (FIG. 3)) for creation of a key) based on a user's operation, an input decision unit (such as sender portion 61 of FIG. 3 for carrying out the processing of step S3 of FIG. 4) for making a decision as to whether transmission of the identification information entered by the input unit has been commanded, a position decision unit (such as receiver portion 62 of FIG. 3 for carrying out the processing of step S5 of FIG. 5) for making a decision as to whether other in-vehicle communication terminal is located within a given close range, an identification information transmission unit (such as sender portion 61 of FIG. 3 for carrying out the processing of step S6 of FIG. 5) for sending the identification information to the other in-vehicle communication terminal in a case where the input decision unit has determined that transmission of the identification information has been commanded and, at the same time, the position decision unit has determined that the other in-vehicle communication terminal is located within the given close range, and a key reception unit (such as receiver portion 62 of FIG. 3 for carrying out the processing of step S7 of FIG. 5) for receiving the first key which has been created by acting on the identification information by the other in-vehicle communication terminal and which has been sent.

An in-vehicle communication terminal (such as display device 12 of FIG. 9) according to a twenty-sixth aspect of the present invention further includes an input unit (such as operation input unit 55 of FIG. 9) for entering identification information (such as information 71 (FIG. 9) for creation of a key) based on a user's operation and a creation unit (such as key creation portion 101 of FIG. 9) for creating the first key based on the identification information entered by the input unit.

An in-vehicle communication terminal (such as display device 12 of FIG. 11) according to a twenty-seventh aspect of the present invention further includes a key storage unit (such as memory 63 of FIG. 11) for previously storing a second key used for encryption, an input unit (such as operation input portion 55) for entering identification information based on a user's operation, an identification information encryption unit (such as encryption portion 142 of FIG. 11 for carrying out the processing of step S104 of FIG. 12) for encrypting the identification information entered by the input unit using the second key, an identification information transmission unit (such as sender portion 61 of FIG. 11 for carrying out the processing of step S105 of FIG. 12) for sending the identification information encrypted by the identification information encryption unit to other in-vehicle communication terminal, and a rewriting unit (such as key change portion 141 of FIG. 11) for rewriting the second key stored in the key storage unit into the first key (such as encryption key 151 of FIG. 11) acted on by the identification information entered by the input unit. Before the second key is rewritten into the first key by the rewriting unit, a content decryption unit (such as encryption portion 142 of FIG. 11) decrypts the contents using the second key. After the second key has been rewritten into the first key by the rewriting unit, the content decryption unit decrypts the contents using the first key.

An in-vehicle communication terminal (such as display device 12 of FIG. 15) according to a twenty-eighth aspect of the present invention further includes a user information readout unit (such as card reader 181 of FIG. 15) for reading out user's information from a storage medium (such as card 171 of FIG. 15) installed in this terminal, an identification information readout unit (such as authentication portion 182 of FIG. 15) for reading out user-specific identification information for identifying the user from a memory based on the user's information read out by the user information readout unit, and an identification information transmission unit (such as sender portion 61 of FIG. 15 for carrying out the processing of step S155 of FIG. 16) for sending the user-specific identification information read out by the identification information readout unit to other in-vehicle communication terminal. A content reception unit receives only contents which have been found as contents whose readouts are not limited as a result of an authentication performed by the other in-vehicle communication terminal based on the user-specific identification information.

An in-vehicle communication terminal (such as display device 12 of FIG. 23) according to a twenty-ninth aspect of the present invention further includes a volume measurement unit (such as data measurement portion 241 of FIG. 23) for measuring the data volume of contents received by the content reception unit and a data information transmission unit (such as sender portion 61 of FIG. 23 for carrying out the processing of step S265 of FIG. 25) for sending information about the data volume measured by the volume measurement unit to other in-vehicle communication terminal. The content reception unit receives the contents whose transfer rates have been modified based on the information about the data volume by the other in-vehicle communication terminal.

A communication method according to a thirtieth aspect of the present invention comprises the steps of: receiving contents (such as step S32 of FIG. 7) encrypted and sent by other in-vehicle communication terminal using a key acted on by identification information about a vehicle; decrypting the received contents (such as step S33 of FIG. 7) using the key, and controlling outputting (such as step S34 of FIG. 7) of the contents decrypted by a content decryption unit.

Since program recording medium according to a thirty-first aspect of the present invention and program according to a thirty-second aspect are fundamentally identical in configuration with the above-described communication method according to the thirtieth aspect, their description is omitted to prevent repetition of the same description.

The preferred embodiments of the present invention are hereinafter described with reference to the drawings.

FIG. 1 shows an example of configuration of a wireless communication system 1 to which the present invention is applied. In the example of FIG. 1, a content server 11 is installed inside of a vehicle. Display devices 12-1 to 12-3 are connected with the content server 11 by a wireless communication technology stipulated, for example, in IEEE802.11b. The display devices 12-1 to 12-3 have LCDs (liquid-crystal displays) 21-1 to 21-3, respectively, for viewing and listening to the contents stored in the content server 11. In the following description, in cases where it is not necessary to discriminate between the individual display devices 12-1 to 12-3 or between the individual LCDs 21-1 to 21-3, they will be simply collectively referred to as display device 12 and LCD 21, respectively.

The content server 11 and display device 12 have common keys (i.e., an encryption key and a corresponding decryption key) on which information 71 (which will be described with reference to FIG. 3) for creating the keys has been acted. The information 71 for creating the keys is fundamental information for creating the common keys necessary to encrypt and communicate data between both server and display device. The information 71 for creating the keys is about a vehicle, such as production number of the vehicle, plate number of the vehicle, engine key number, or user's driver's license number.

The content server 11 is installed, for example, under a seat of the vehicle or within the rear trunk. For example, contents of maps used during operation of a car navigational system and contents such as movies and musics that are viewed and listened to on the rear seats are stored in the server. The contents may also be stored in a recording medium installed in the content server 11. The content server 11 reads out the stored contents according to a request from the display device 12, encrypts the read contents using an encryption key shared with the display device 12, and sends the contents to the display device 12.

The display device 12 is installed, for example, besides the driver's seat to manipulate the car navigational system or installed behind the driver or front passenger seat to permit users on the rear seats to view and listen to contents such as movies. The display device 12 makes a request for some of the contents stored in the content server 11, decrypts the contents sent in from the server 11 using the decryption key shared with the content server 11, and displays the contents on the LCD 21.

As described so far, in the wireless communication system 1, the contents are sent and received, using the common keys (encryption key and corresponding decryption key) acted on by the information 71 for creating the keys. The information 71 is made up of information about production number of the vehicle, plate number of the vehicle, engine key number, or user's driver's license number.

In FIG. 1, three display devices 12 are connected with the content server 11. The number of display devices 12 connected with the server 11 is not limited to three. Only one device or more than three devices may be connected. Furthermore, if the vehicle is within a wireless accessible area, the display device 12 may be taken out of the vehicle, the user may gain access to the interior content server 11 from outside the vehicle, and the contents may be displayed.

Figure 2:
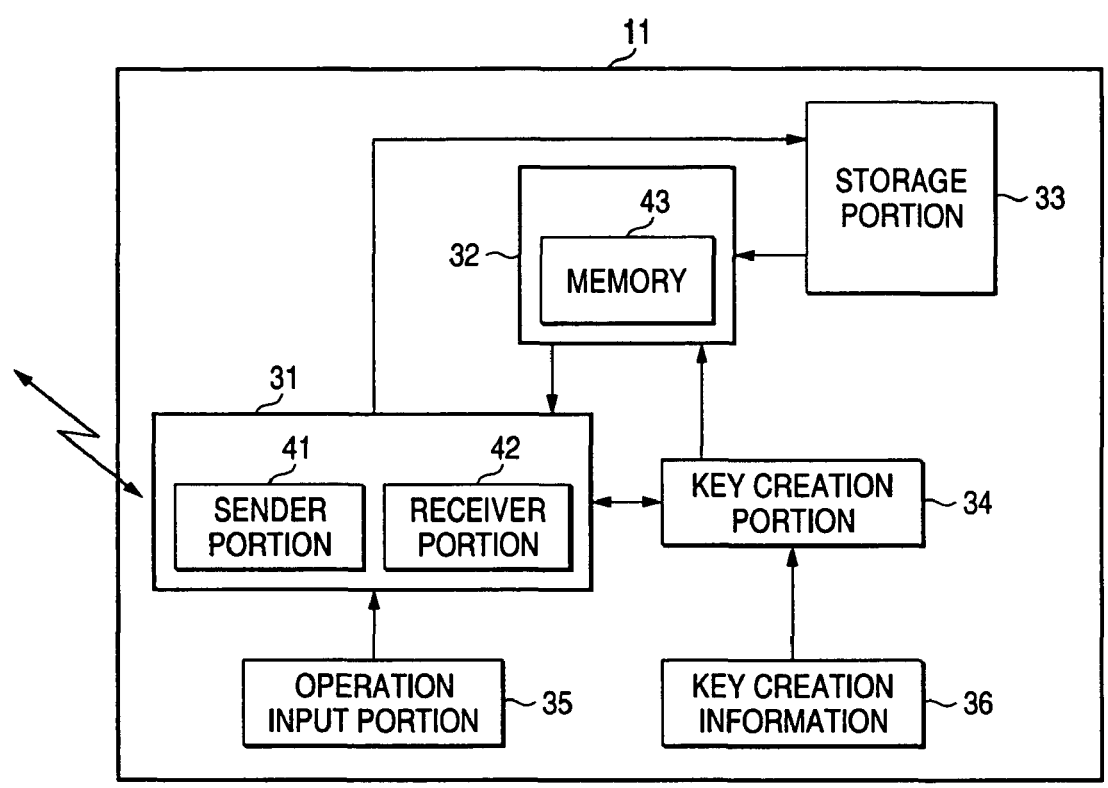
FIG. 2 is a block diagram showing an example of configuration of the content server of FIG. 1.
Figure 3:
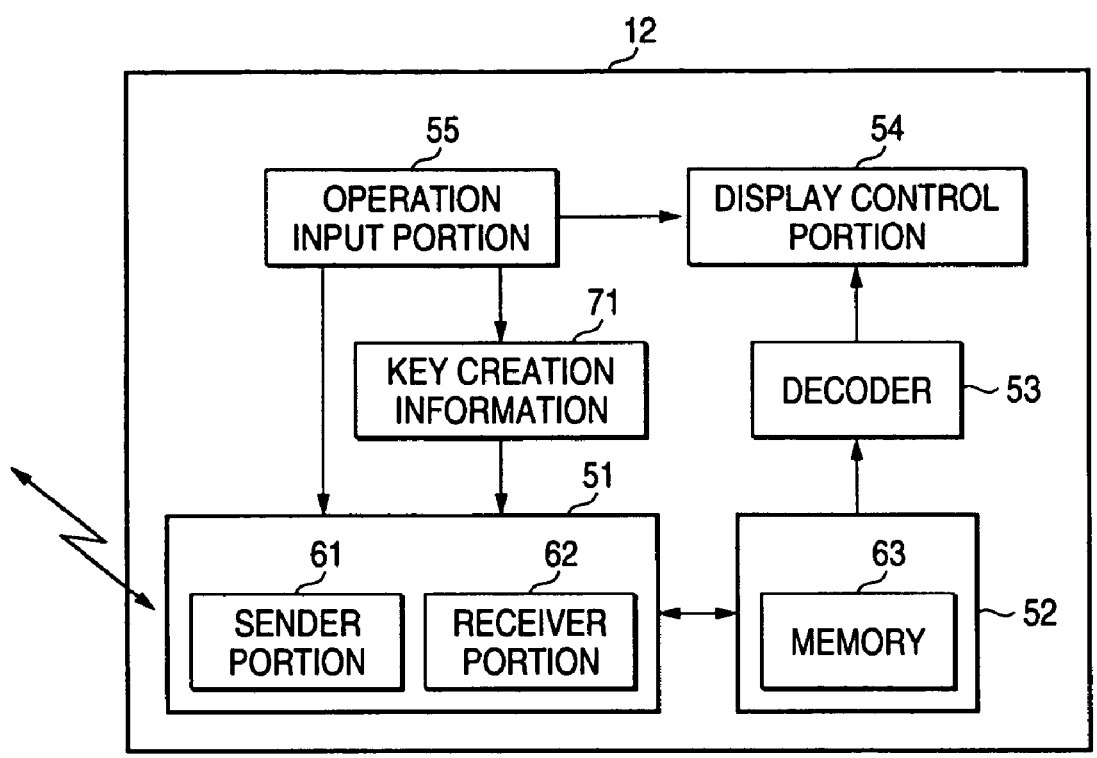
FIG. 3 is a block diagram showing an example of configuration of the display device of FIG. 1.

FIG. 2 shows an example of configuration of the content server 11. In the example of FIG. 2, the content server 11 is made up of a wireless communication portion 31, an encryption portion 32, a storage portion 33, a key creation portion 34, and an operation input portion 35.

The wireless communication portion 31 is composed of a sender portion 41 and a receiver portion 42 and performs wireless communications with the display device 12. The sender portion 41 sends given signals and information to the display device 12. The receiver portion 42 receives the given signals and information sent in from the display device 12. In particular, the sender portion 41 sends contents encrypted by the encryption portion 32 or the common key (decryption key) created by the key creation portion 34 to the display device 12. Also, the sender portion 41 sends a signal responsive to a signal sent in from the display device 12, based on an instruction signal from a user, the instruction signal being entered via the operation input portion 35. On receiving a content request signal from the display device 12, the receiver portion 42 controls the storage portion 33 and reads out the requested contents. The receiver portion 42 receives the key creation information 71 sent in from the display device 12 and supplies it to the key creation portion 34.

The encryption portion 32 incorporates a memory 43, and stores the encryption key supplied from the key creation portion 34 into the memory 43. The encryption portion 32 encrypts the contents supplied from the storage portion 33 with the encryption key stored in the memory 43, and supplies the contents to the sender portion 41. The storage portion 33 stores contents such as maps used during operation of a car navigational system and contents such as movies and musics viewed and listened to on the rear seats. The storage portion 33 reads out the contents indicated by the receiver portion 42 and supplies the contents to the encryption portion 32.

Based on the previously stored key creation information 36 and on the key creation information 71 supplied from the receiver portion 42, the key creation portion 34 creates the keys (encryption key and decryption key) shared between the content server 11 and display device 12, supplies the created decryption key and encryption key to the sender portion 41 and encryption portion 32, respectively. The information 36 for creation of the keys is made up of the serial number of the server 11, for example. The information 36 for creation of the keys may be information about the vehicle itself or driving of the vehicle such as production number of the vehicle, plate number of the vehicle, engine key number, or user's driver's license number, in the same way as the key creation information 71. The operation input portion 35 includes control buttons to be operated by the user and a receive button 81 (which will be described later with reference with FIG. 6) indicated when the key creation information 71 is received from the display device 12.

FIG. 3 shows an example of configuration of the display device 12. In the example of FIG. 3, the display device 12 consists of a wireless communication portion 51, a decryption portion 52, a decoder 53, a display control portion 54, and an operation input portion 55.

The wireless communication portion 51 is composed of a sender portion 61 and a receiver portion 62, and performs wireless communications with the content server 11. The sender portion 61 sends given signals or information to the content server 11. The receiver portion 62 receives the contents or given information sent in from the content server 11. Specifically, the sender portion 61 sends an acknowledgement (ACK) signal for checking if the content server 11 is in a given close range, key creation information 71, or content request signal to the content server 11, based on an instruction signal from the user, the instruction signal being entered via the operation input portion 55. The receiver portion 62 receives the decryption key or contents sent in from the content server 11 and supplies the key or contents to the decryption portion 52.

The decryption portion 52 incorporates a memory 63 and stores the decryption key supplied from the receiver portion 62 into the memory 63. The decryption portion 52 decrypts the contents, using the decryption key in the memory 63, and supplies the decrypted contents to the decoder 53. The decoder 53 decodes the contents decrypted by the decryption portion 52 and supplies the decrypted contents to the display control portion 54. The display control portion 54 provides control in such a way that the contents from the decoder 53 are displayed on the display portion such as LCD 21. Also, the display control portion 54 creates a screen image according to an instruction from the operation input portion 55 and displays the created screen image on the LCD 21.

The operation input portion 55 includes control buttons to be operated by the user and a send button 82 (described later with reference to FIG. 6) indicated when the key creation information 71 is sent. The operation input portion 55 supplies the key creation information 71 entered by the user to the wireless communication portion 51 or supplies other information entered by the user to the wireless communication portion 51 or display control portion 54. The key creation information 71 consists of information regarding the vehicle such as production number of the vehicle, plate number of the vehicle, engine key number, or user's driver's license number, as described previously.

Processing for registering the keys in the wireless communication system 1 is described next by referring to the flowcharts of FIGS. 4 and 5. This processing is executed only when the display device 12 makes a first wireless communication with the content server 11.

When the user operates the operation input portion 55 and activates the display device 12, the sender portion 61 determines that it is the first communication processing step. In step S1, the sender portion controls the display control portion 54 and displays the screen image for registering the key creation information on the LCD 21. The user views the screen image for registering the key creation information displayed on the LCD 21 and operates the control buttons on the operation input portion 55 to enter the key creation information 71 such as production number of the vehicle, plate number of the vehicle, engine key number, or user's driver's license number.

Figure 6:
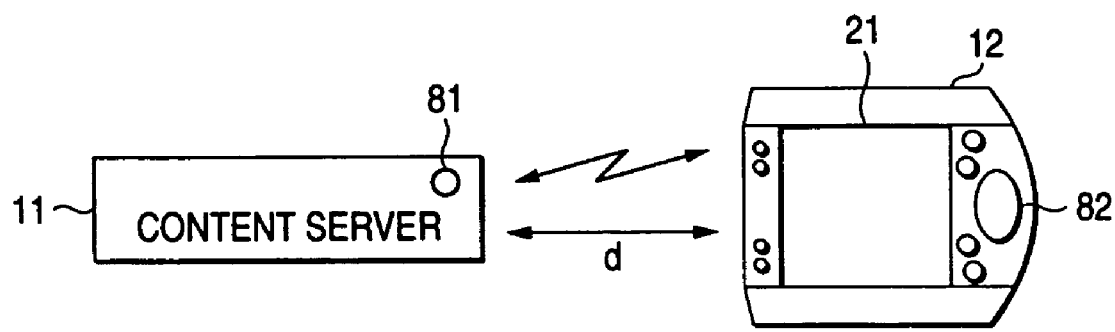
FIG. 6 is a diagram illustrating processing (operation) of the wireless communication system of FIG. 1 to register keys.

Correspondingly, the operation input portion 55 supplies the entered key creation information 71 to the sender portion 61 in step S2 and then goes to step S3. After entering the key creation information 71, the user places the display device 12 in a position close to the content server 11 to send the key creation information 71 to the content server 11 as shown in FIG. 6. For example, the distance d from the content server 11 is within 10 cm. Preferably, this distance d is so set that communication from outside of the vehicle is impossible to achieve.

In the example of FIG. 6, the content server 11 has a receive button 81 for receiving the key creation information 71. The display device 12 has a send button 82 for sending the key creation information 71. Accordingly, the user manipulates the receive button 81 and send button 82.

In the content server 11, information indicating operation of the receive button 81 is supplied to the receiver portion 42 via the operation input portion 35. The receiver portion 42 waits until the receive button 81 is operated in step S11. If it has been determined based on the information from the operation input portion 35 that the receive button 81 has been operated, the server goes to step S12, where the server waits until an acknowledgement signal from the display device 12 is received.

In the display device 12, information indicating operation of the send button 82 is supplied to the sender portion 61 via the operation input portion 55. The sender portion 61 waits until the send button 82 is operated in step S3. If it has been determined based on the information from the operation input portion 55 that the send button 82 has been operated, the display device proceeds to step S4, where an acknowledgement (ACK) signal is sent to check if the content server 11 is located within a given short distance d. The display device goes to step S5 of FIG. 5. In this step S4 and subsequent steps, the display device 12 and content server 11 send and receive given signals and information at an electromagnetic wave strength at which only devices located within the given short distance d can receive them. That is, this acknowledgement signal is sent at the electromagnetic wave strength at which the acknowledgement signal, a response signal (described below), the key creation information 71, and the decryption key can be received only by devices located within the given short distance d.

Correspondingly, the receiver portion 42 of the content server 11 determines in step S12 that the acknowledgement signal from the display device 12 has been received, and the receiver portion goes to step S13, where the sender portion 41 is controlled. A signal responsive to the acknowledgement signal is sent to the content server 11, and the receiver portion proceeds to step S14 of FIG. 5.

Figure 5:
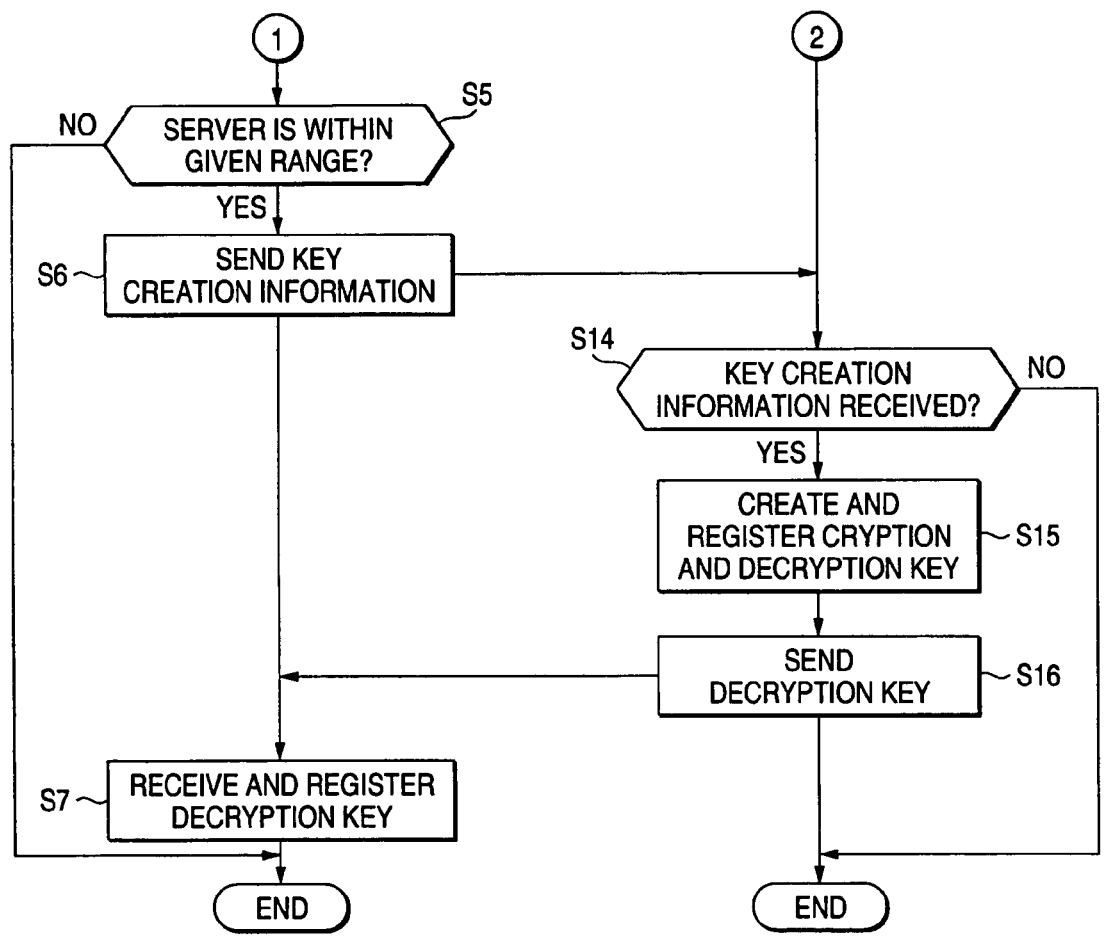
FIG. 5 is a flowchart illustrating processing for registering keys in the content server of FIG. 2 and in the display device of FIG. 3.

The receiver portion 62 of the display device 12 makes a decision in step S5 of FIG. 5 as to whether the response signal from the content server 11 has been received or not. That is, the receiver portion makes a decision as to whether the position of the content server 11 is within the given short distance d. If the receiver portion 62 determines in step S5 that it has received no response signal from the content server 11, i.e., if the receiver portion has determined that the content server 11 is not positioned within the given short distance d, the processing of steps S6 and S7 is skipped. Then, the processing for registering the keys is ended. If the receiver portion 62 receives the response signal from the content server 11 in step S5 and has determined that the position of the content server 11 is within the given short distance d, the receiver portion goes to step S6, where the receiver portion controls the sender portion 61 to send the key creation information 71 supplied from the operation input portion 55 to the content server 11. Then, the receiver portion proceeds to step S7.

On the other hand, the receiver portion 42 of the content server 11 makes a decision in step S14 of FIG. 5 as to whether it has received the key creation information 71 from the display device 12 or not. If the decision is that the receiver portion has not received the key creation information 71 from the display device 12, the processing of steps S15 and S16 is skipped. The processing for registering the keys is ended. Furthermore, if the receiver portion 42 determines in step S14 that it has received the key creation information 71 from the display device 12, the receiver portion supplies the key creation information 71 to the key creation portion 34 and then goes to step S15.

In step S15, the key creation portion 34 acts on the key creation information 71 supplied from the receiver portion 42 and the previously stored key creation information 36, and creates keys (encryption and decryption keys) shared between the content server 11 and display device 12. The created encryption and decryption keys are supplied to the encryption portion 32 and sender portion 41, respectively. Then, the key creation portion goes to step S16. At this time, the encryption portion 32 stores the encryption key from the key creation portion 34 into the memory 43. In step S16, the sender portion 41 sends the decryption key created by the key creation portion 34 to the display device 12. Then, the processing for registering the keys is ended.

In step S7, the receiver portion 62 of the display device 12 receives the decryption key sent in from the display device 12, and supplies the received decryption key to the decryption portion 52. The decryption portion 52 registers the decryption key in the memory 63. Then, the processing for registering the keys is ended.

Figure 4:
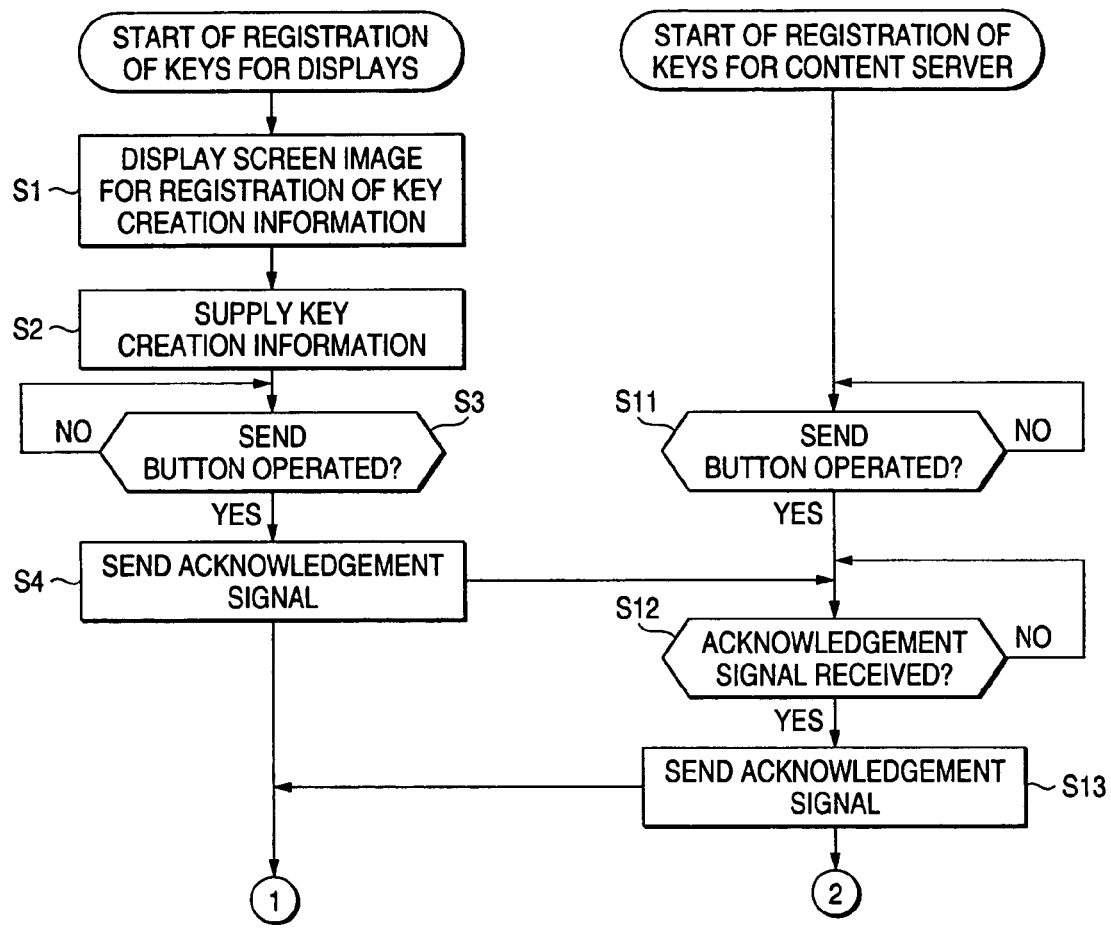
FIG. 4 is a flowchart illustrating processing for registering keys in the content server of FIG. 2 and in the display device of FIG. 3.

In the description of the processing for registering the keys illustrated in FIG. 4, the buttons on the content server 11 and on the display device 12 are operated to send and receive the key creation information and created common keys. Alternatively, the key creation information and created common keys may be received and sent by operating only the send button 82 on the display device 12 or the content server 11.

In the processing for registering the keys as illustrated in FIG. 4, a decision is made as to whether the content server 11 is located within the given short distance d, depending on whether a response signal is received or not. Alternatively, the send strength of the response signal may be preset, and a decision may be made as to whether the content server 11 is located within the given short distance d, depending on the receive strength of the response signal.

As described above, the key creation information for creating the common keys and the created common keys are sent and received at the given short distance. Therefore, eavesdropping from the outside is suppressed. Information can be sent securely.

Processing performed by the wireless communication system 1 to send and receive contents using the common keys registered as described above is next described by referring to the flowchart of FIG. 7.

The user operates the operation input portion 55 of the display device 12 to make a request of desired contents. The operation input portion 55 supplies a content request signal to the sender portion 61 in response to the user's operation. In step S31, the sender portion 61 sends the content request signal to the content server 11, the content request signal being supplied via the operation input portion 55.

On receiving the content request signal from the display device 12, the receiver portion 42 of the content server 11 reads contents from the storage portion 33 in response to this signal in step S41. The receiver portion supplies the contents to the encryption portion 32 and then goes to step S42. The encryption portion 32 encrypts the contents read from the storage portion 33, using the encryption key which has been created in step S15 of FIG. 5 and is stored in the memory 43. The encryption portion supplies the encrypted contents to the sender portion 41 and then goes to step S43. In step S43, the sender portion 41 sends the contents encrypted by the encryption portion 32 to the display device 12. Then, the processing for sending the contents is ended.

Meanwhile, the receiver portion 62 of the display device 12 receives the contents from the content server 11, supplies the received contents to the decryption portion 52 in step S32, and goes to step S33. The decryption portion 52 decrypts the contents from the receiver portion 62 using the decryption key stored in the memory 63, supplies the decrypted contents to the decoder 53, and then goes to step S34. In step S34, the decoder 53 decodes the contents decrypted by the decryption portion 52 and supplies the decoded contents to the display control portion 54. The display control portion 54 displays the contents from the decoder 53 on the LCD 21. The processing for receiving the contents is ended.

As described thus far, the content server 11 and display device 12 share the keys (encryption and decryption keys) created based on the key creation information 71 consisting of information regarding the vehicle. The contents are encrypted using the shared common keys and sent and received. Therefore, eavesdropping from other device outside of the vehicle is suppressed. Since the common keys are registered, if the common keys are once created, it is not necessary that the content server 11 and display device 12 be again brought to a given distance and a communication be performed. If their distance is a wireless accessible distance, encrypted contents can be sent and received using the common keys.

Furthermore, since information regarding the vehicle such as production number of the vehicle, plate number of the vehicle, engine key number, or user's driver's license number is used as the key creation number 71, it is easy for the user to perform management operations. In the above embodiment, the key creation information 71 is entered from the operation input portion 55. Alternatively, the engine key number may be entered by inserting the vehicle key into the display device 12. Also, the driver's license number may be entered by inserting a user's driver's license into the display device 12. In these cases, labor that would normally be required to directly enter the key creation information 71 can be omitted. Also, incorrect inputting can be suppressed.

FIG. 8 shows another example of configuration of the content server 11 of FIG. 2. The server 11 of FIG. 8 is similar in configuration to the content server 11 already described in connection with FIG. 2 except that a key creation information holding portion 91 is added and that the operation input portion 35 is omitted.

In the example of FIG. 8, key creation information 71 such as production number of the vehicle, plate number of the vehicle, engine key number, or user's driver's license number was previously written into the key creation information holding portion 91 in addition to the key creation information 36 by the use of a ROM writer or the like at the time of shipment or purchase of the content server 11.

The key creation portion 34 acts on the key creation information 36 and key creation information 71 written in the key creation information holding portion 91 to create the common key (encryption key). It is supplied to the encryption portion 32. The encryption portion 32 stores the encryption key supplied from the key creation portion 34 into the memory 43. The encryption portion encrypts the contents of the storage portion 33 using the stored encryption key, and supplies the encrypted key to the sender portion 41.

The sender portion 41 sends the contents, which have been encrypted by the encryption portion 32, to the display portion 12. On receiving a content request signal from the display device 12, the receiver portion 42 controls the storage portion 33 and reads out the requested contents.

FIG. 9 shows another example of configuration of the display device 12. The display device 12 of FIG. 9 is similar in configuration to the display device 12 already described in connection with FIG. 3 except that a key creation portion 101 is added.

In the example of FIG. 9, key creation information 36 is entered by the user into the operation input portion 55, in addition to the key creation information 71. The operation input portion 55 supplies the key creation information 71 and key creation information 36 entered by the user to the key creation portion 101.

The key creation portion 101 creates the key (decryption key) shared with the content server 11 by acting on the key creation information 71 and key creation information 36 supplied from the operation input portion 55, in the same way as the key creation portion 34 of FIG. 8. The created decryption key is supplied to the decryption portion 52. The decryption portion 52 stores the decryption key supplied from the key creation portion 101 into the memory 63. The contents supplied from the receiver portion 62 are decrypted using the decryption key and supplied to the decoder 53.

The sender portion 61 sends the content request signal to the content server 11 based on an instruction signal from the user, the signal being entered via the operation input portion 55. The receiver portion 62 receives the contents sent in from the content server 11 and supplies the contents to the decryption portion 52.

In the wireless communication system 1 consisting of the content server 11 of FIG. 8 and display device 12 of FIG. 9 as described above, the key creation information 71 and the key creation information 36 are acted on to create the common keys in both devices. Accordingly, the processing for registering the keys as already described in connection with FIGS. 4 and 5 (i.e., processing for sending and receiving the key creation information and common keys to and from the display device 12) is made unnecessary, unlike the content server 11 of FIG. 2 and the display device 12 of FIG. 3. Processing similar to the processing for sending and receiving the contents as already described in connection with FIG. 7 can be immediately carried out. Description of this processing is omitted to prevent repetition of the same description.

That is, none of the key creation information and common keys are sent or received. Therefore, in the wireless communication system 1 consisting of the content server 11 of FIG. 8 and the display device 12 of FIG. 9, the security can be made tighter than the wireless communication system 1 consisting of the content server 11 of FIG. 2 and the display device 12 of FIG. 3. Furthermore, it is not necessary to bring the devices close to each other within a given distance to register the common keys. In addition, neither the receive button 81 nor the send button 82 is necessary. Consequently, the costs to mount these buttons 81 and 82 can be reduced.

Furthermore, information about the vehicle such as production number of the vehicle, plate number of the vehicle, engine key number, or user's driver's license number is used as the key creation information and so when the key creation information is entered into the display device 12, the possibility that it is impossible for the user to enter the information by forgetting the key creation information or losing a document having the key creation information is suppressed.

FIG. 10 shows a further example of configuration of the content server 11 of FIG. 2. The content server 11 of FIG. 10 is similar in configuration to the content server 11 already described in connection with FIG. 2 except that a key change portion 121 is added and that the operation input portion 35 is omitted.

In the example of FIG. 10, an encryption key (hereinafter referred to as the initial encryption key) was previously written into the memory 43 of the encryption portion 32 at the time of shipment or purchase of the content server 11. This initial encryption key corresponds to the initial encryption key (described later) previously written in the display device 12 of FIG. 11. The information encrypted with the initial encryption key for the content server 11 is decrypted with the initial encryption key for the display device 12. The information encrypted with the initial encryption key for the display device 12 is decrypted with the initial encryption key for the content server 11.

When the content server 11 is mounted, the encryption portion 32 encrypts the contents supplied from the storage portion 33 using the initial encryption key stored in the memory 43 and supplies the encrypted contents to the sender portion 41. Additionally, the encryption portion 32 decrypts the information, which has been encrypted by the display device 12 using the initial encryption key and sent in, by the use of the initial encryption key.

The key change portion 121 creates the encryption key 131 by acting on the key creation information 71 which has been decrypted by the encryption portion 32 and sent from the display device 12. The key change portion rewrites the initial encryption key stored in the memory 43 into the created encryption key 131. In the display device 12, too, an encryption key 151 (described later by referring to FIG. 11) corresponding to the encryption key 131 is created by acting on the key creation information 71 and newly rewritten. Accordingly, the encryption portion 32 subsequently encrypts the contents supplied from the storage portion 33 using the encryption key 131 newly rewritten in the memory 43 and supplies the encrypted contents to the sender portion 41. Furthermore, the encryption portion 32 decrypts the information, which has been encrypted using the encryption key 151 rewritten by the display device 12 and sent in, through the use of the rewritten encryption key 131.

The sender portion 41 sends the contents, which have been encrypted by the encryption portion 32, to the display device 12. On receiving a content request signal from the display device 12, the receiver portion 42 controls the storage portion 33 and reads out the requested contents. The receiver portion 42 receives the key creation information 71 sent in from the display device 12 and supplies the information to the encryption portion 32.

Figure 11:
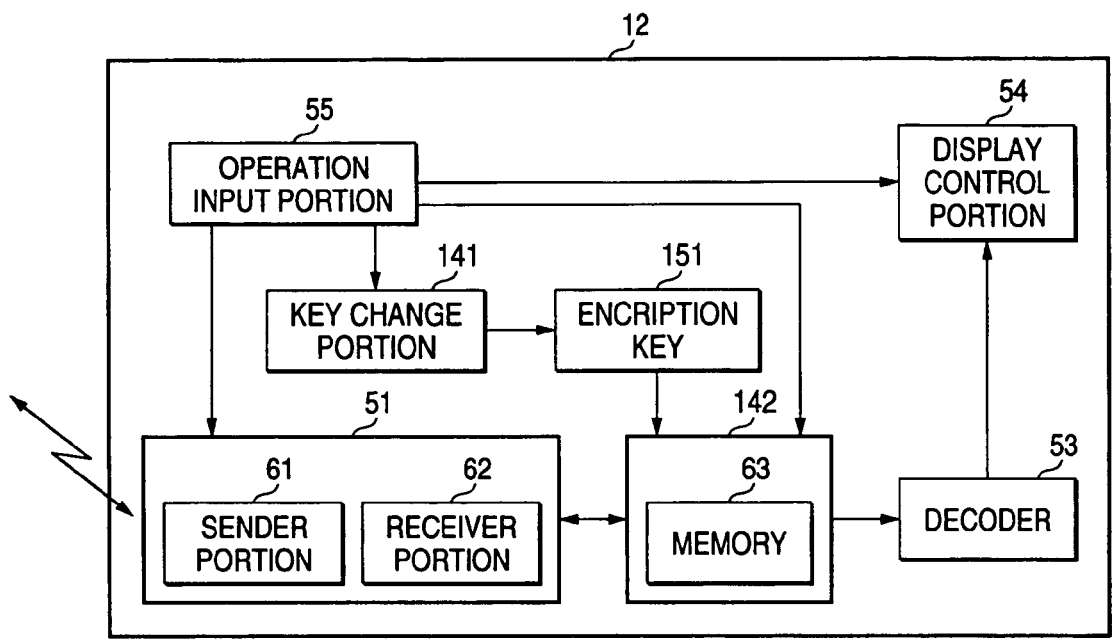
FIG. 11 is a block diagram showing a further example of the display device of FIG. 11.

FIG. 11 shows a still other example of configuration of the display device 12. The display device 12 of FIG. 11 is similar in configuration to the display device 12 already described in connection with FIG. 3 except that a key change portion 141 and an encryption portion 142 are added and that the decryption portion 52 is omitted.

In the example of FIG. 11, the encryption portion 142 has a built-in memory 63 in the same way as the decryption portion 52 of FIG. 3. The memory 63 was previously written with an initial encryption key at the time of shipment or purchase of the display device 12 in the same way as the above-described content server 11 of FIG. 10. This initial encryption key corresponds to the initial encryption key previously written in the content server 11. The information encrypted with the initial encryption key for the display device 12 is decrypted with the initial encryption key for the content server 11. The information encrypted with the initial encryption key for the content server 11 is decrypted with the initial encryption key for the display device 12.

At the beginning of installation of the display device 12, the encryption portion 142 decrypts the contents supplied from the receiver portion 62, using the initial encryption key stored in the memory 63, and supplies the decrypted contents to the decoder 53. Furthermore, the encryption portion 142 encrypts the key creation information 71 with the initial encryption key and supplies the encrypted information to the sender portion 61, the information 71 being entered via the operation input portion 55.

The key change portion 141 acts on the key creation information 71 entered via the operation input portion 55, and creates the encryption key 151. The key change portion rewrites the initial encryption key stored in the memory 63 of the encryption portion 142 into the created encryption key 151. As mentioned previously, in the content server 11, too, the encryption key 131 corresponding to the encryption key 151 is created by acting on the key creation information 71 and is newly rewritten. Accordingly, the encryption portion 142 subsequently decrypts the contents supplied from the receiver portion 62, using the encryption key 151 newly rewritten in the memory 63, and supplies the decrypted contents to the decoder 53. The encryption portion 142 encrypts the key creation information entered via the operation input portion 55 with the rewritten encryption key 151, and supplies the encrypted information to the sender portion 61.

The sender portion 61 sends a content request signal to the content server 11, based on the key creation information 71 encrypted by the encryption portion 142 and on the user's instruction signal entered via the operation input portion 55. The receiver portion 62 receives the contents sent in from the content server 11 and supplies the contents to the encryption portion 142.

Figure 12:
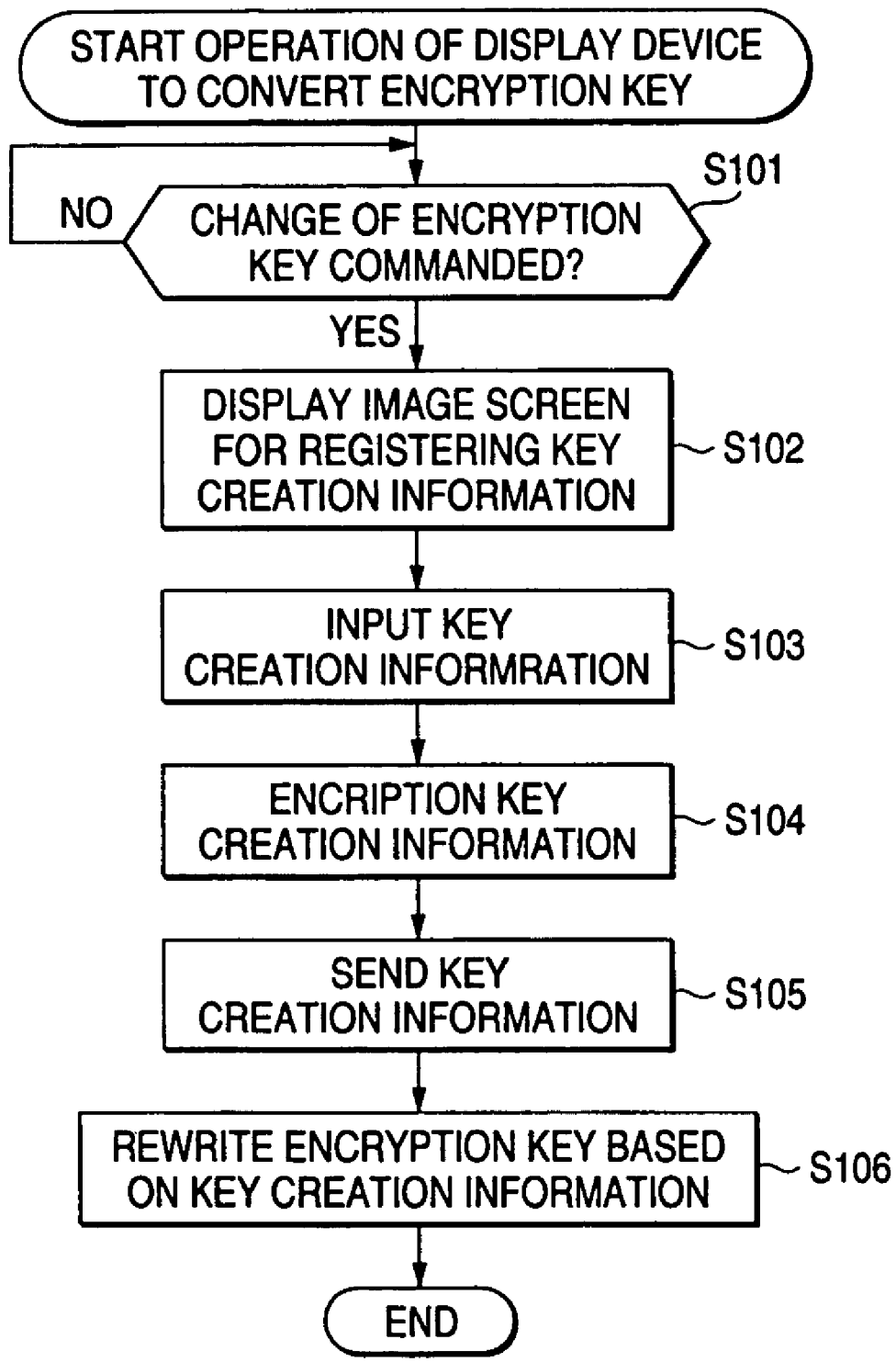
FIG. 12 is a flowchart illustrating processing for modifying the encryption key for the display device of FIG. 11.
Figure 13:
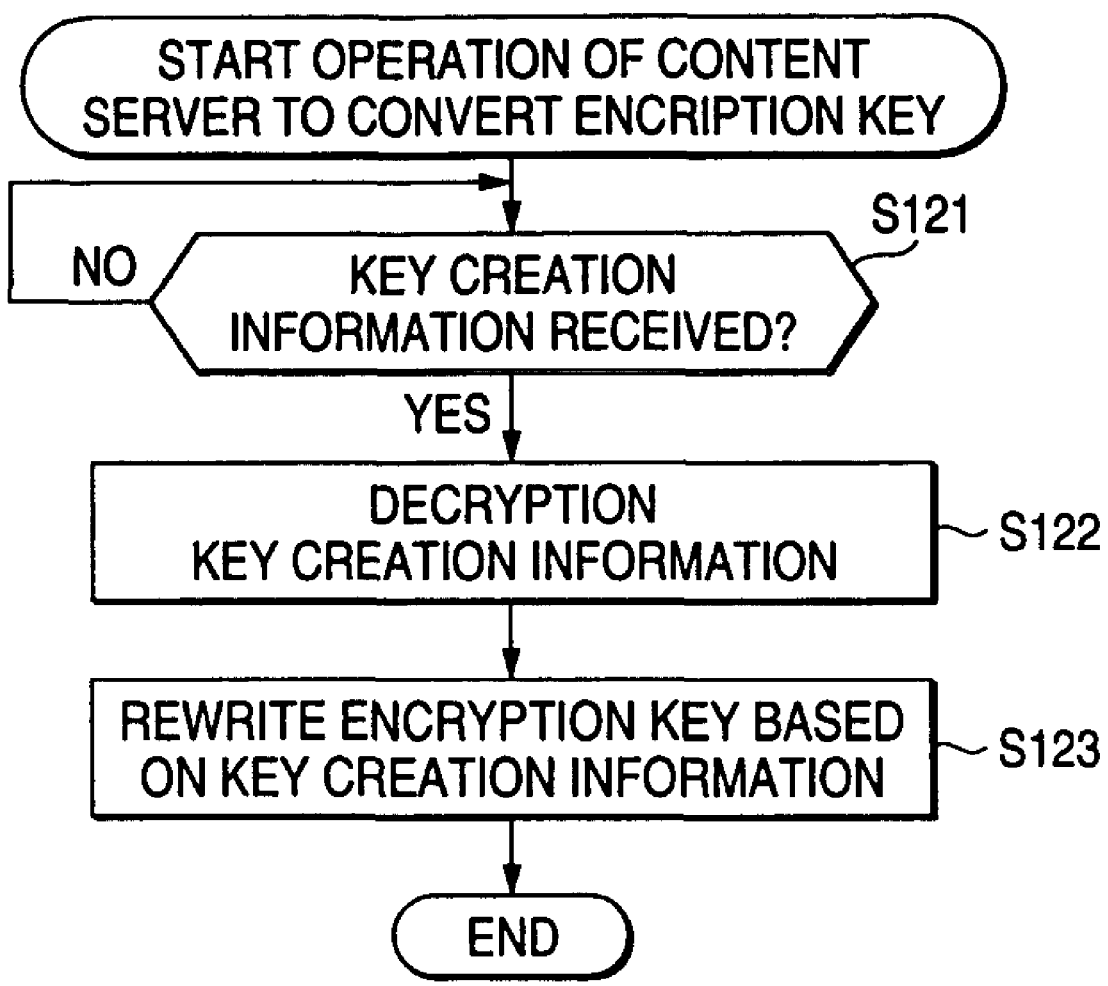
FIG. 13 is a flowchart illustrating processing for modifying the encryption key for the content server of FIG. 10.

Processing of the content server 11 of FIG. 10 and display device 12 of FIG. 11 to modify the encryption key is next described by referring to the flowcharts of FIGS. 12 and 13. FIG. 12 illustrates the processing of the display device 12 of FIG. 11 to modify the encryption key. FIG. 13 illustrates the processing of the content server 11 of FIG. 10 to modify the encryption key in a corresponding manner to the processing of FIG. 12.

The content server 11 and display device 12 carry out the processing for sending and receiving contents using the initial encryption key previously stored in the memory 43 of the encryption portion 32 and in the memory 63 of the encryption portion 142 during the time interval between the instant when the content server 11 of FIG. 10 and display device 12 of FIG. 11 are installed in position within the vehicle and the instant when this processing for modifying the encryption key is performed.

This processing for sending and receiving contents is fundamentally the same as the above-described processing (FIG. 7) for sending and receiving contents and so its description is omitted. In the case of the content server 11 of FIG. 10 and display device 12 of FIG. 11, the encryption portion 32 of the content server 11 encrypts the contents using the initial encryption key stored in the memory 43 and supplies the encrypted contents to the sender portion 41 in step S42 of FIG. 7. In step S33 of FIG. 7, the encryption portion 142 of the display device 12 decrypts the contents, using the initial encryption key stored in the memory 63, and supplies the decrypted contents to the decoder 53.

The user operates given control buttons on the operation input portion 55 to newly modify the encryption key from this initial encryption key. The display control portion 54 waits until modification of the encryption key is commanded in step S101 of FIG. 12. If it is determined that an instruction signal for modifying the encryption key has been entered via the operation input portion 55, the display control portion goes to step S102. A screen image for registering key creation information is displayed on the LCD 21. Then, the display control portion goes to step S103. The user views the screen image for registering key creation information displayed on the LCD 21 and operates control buttons on the operation input portion 55 to enter the key creation information 71 such as production number of the vehicle, plate number of the vehicle, engine key number, or user's driver's license number. In step S103, the operation input portion 55 enters the key creation information 71 based on the user's operation, supplies the entered key creation information 71 to the key change portion 141 and to the encryption portion 142, and then goes to step S104.

In step S104, the encryption portion 142 encrypts the key creation information 71 with the initial encryption key previously stored in the memory 63, the key creation information 71 being supplied via the operation input portion 55. The encryption portion goes to step S105. The sender portion 61 is controlled to send the encrypted key creation information 71 to the content server 11, and then the encryption portion proceeds to step S106.

In step S106, the key change portion 141 rewrites the initial encryption key stored in the memory 63 into the newly created encryption key 151, based on the key creation information 71 supplied via the operation input portion 55. That is, the key change portion 141 acts on the key creation information 71, creates an encryption key newly, and rewrites the initial encryption key stored in the memory 63 into the newly created encryption key 151. Then, the processing for changing the encryption key is ended.

Meanwhile, the receiver portion 41 of the content server 11 waits until the key creation information 71 is received in step S121 of FIG. 13. In the above-described step S105 of FIG. 12, the key creation information 71 is sent in from the display device 12. The receiver portion 41 determines in step S121 that it has received the key creation information 71, supplies the received key creation information 71 to the encryption portion 32, and then goes to step S122. The encryption portion 32 decrypts the key creation information 71 with the initial encryption key previously stored in the memory 43 in step S122, supplies the decrypted key creation information 71 to the key change portion 121, and then goes to step S123.

The key change portion 121 rewrites the initial encryption key stored in the memory 43 into the newly created encryption key 131 based on the key creation information 71 supplied from the encryption portion 32 in step S123. That is, the key change portion 121 acts on the key creation information 71 and newly creates the encryption key 131. The key change portion rewrites the initial encryption key stored in the memory 43 into the newly created encryption key 131. Then, the processing for changing the encryption key is ended.

Since the encryption key used in the wireless communication system 1 is changed in this way, the contents are encrypted and decrypted using the changed encryption keys 131 and 151 instead of the initial encryption keys during the processing for sending and receiving the contents as already described in connection with FIG. 7 after the encryption keys are modified to the encryption keys 131 and 151. That is, after the encryption keys are modified to the encryption keys 131 and 151, the encryption portion 32 of the content server 11 encrypts the contents using the rewritten encryption key 131 in the memory 43 and supplies the encrypted contents to the sender portion 41 in step S42 of FIG. 7. Furthermore, in step S33 of FIG. 7, the encryption portion 142 of the display device 12 decrypts the contents using the rewritten encryption key 151 in the memory 63 and supplies the decrypted contents to the decoder 53.

As described so far, when contents are sent and received, the encryption keys 131 and 151 created and rewritten based on the key creation information 71 such as production number of the vehicle, plate number of the vehicle, engine key number, or user's driver's license number are used. Therefore, the security of the encryption keys is enhanced compared with the case where only the initial encryption keys are used. Moreover, unlike the case of the content server 11 and display device 12 of FIGS. 2 and 3, it is not necessary to bring the devices closer to each other. Consequently, the encryption keys 131 and 151 created based on the key creation information 71 can be used easily while the devices are left in position.

FIG. 14 shows another example of configuration of the content server 11. The content server 11 of FIG. 14 is similar in configuration to the content server 11 already described in connection with FIG. 2 except that an authentication portion 161 and a selection portion 162 are added and that the key creation portion 34 and the operation input portion 35 are omitted.

In the example of FIG. 14, the encryption portion 32 previously has an encryption key in the memory 43. Based on this, the encryption portion 32 decrypts person identification data received from the receiver portion 42 and supplies the decrypted person identification data to the authentication portion 161. The person identification data is used to identify individual users and create an encryption key dedicated to each user. The person identification data includes key creation information 71 dedicated for the user. The encryption portion 32 acts on the person identification data based on the result of an authentication performed by the authentication portion 161, creates the encryption key dedicated to the user, encrypts the contents from the selection portion 162 using the created encryption key, and supplies the contents to the sender portion 41. The user dedicated encryption key once created may be stored in the memory 43.

The authentication portion 161 authenticates the user based on the person identification data decrypted by the encryption portion 32, and supplies the results of the authentication to the selection portion 162 and to the encryption portion 32. The selection portion 162 limits the contents read from the storage portion 33 based on the results of authentication performed by the authentication portion 161. That is, the selection portion 162 provides control such that only contents allowed for the user authorized by the authentication portion 161 can be read out.

The sender portion 41 sends the contents encrypted by the encryption portion 32 to the display device 12. On receiving a content request signal from the display device 12, the receiver portion 42 supplies the content request signal to the selection portion 162. Also, the receiver portion 42 receives the person identification data sent in from the display device 12 and supplies the data to the encryption portion 32.

Figure 15:
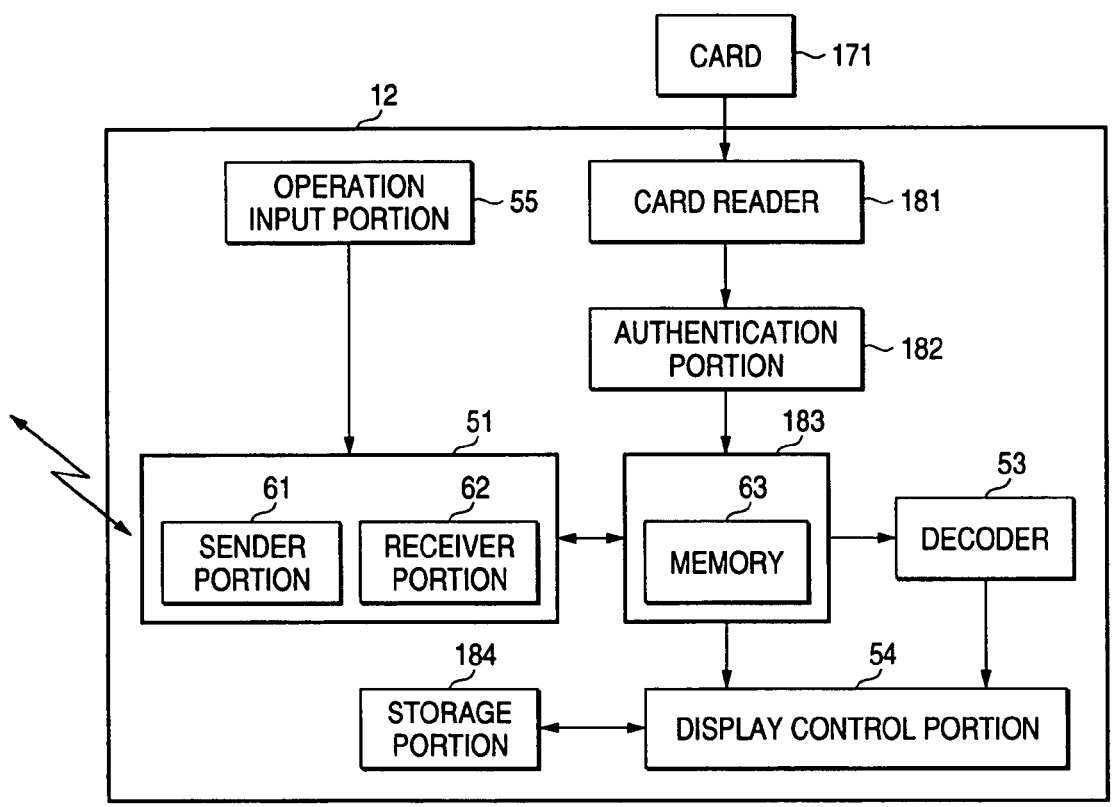
FIG. 15 is a block diagram showing a further example of configuration of the display device of FIG. 1.

FIG. 15 shows another example of configuration of the display device 12. The display device 12 of FIG. 15 is similar in configuration to the display device 12 already described in connection with FIG. 3 except that a card reader 181, an authentication portion 182, an encryption portion 183, and a storage portion 184 are added and that the decryption portion 52 is omitted.

A card 171 made of an IC (integrated circuit) card or the like can be inserted into and withdrawn from the display device 12 of FIG. 15. In the example of FIG. 15, the card 171 is an authentication card which stores authentication data necessary to authenticate the user in the display device 12. The card reader 181 reads the authentication data from the card 171 inserted in the display device 12 and supplies the read authorization data to the authentication portion 182. The authentication portion 182 reads authentication information including user dedicated decryption key and person identification data from an internal memory (not shown) based on the authorization data supplied from the card reader 181, and supplies the read key and data to the encryption portion 183. The person identification data is used to identify the user himself or herself as mentioned previously and to cause the content server 11 to create the user dedicated encryption key. The person identification data includes user dedicated key creation information 71 previously registered by the user.

The encryption portion 183 has a built-in memory 63 in the same way as the decryption portion 52 of FIG. 3. The encryption portion encrypts the person identification data using the encryption key previously stored in the memory 63 and sends the encrypted person identification data to the content server 11 via the sender portion 61. Also, the encryption portion 183 supplies the person identification data from the authentication portion 182 to the display control portion 54. Furthermore, the encryption portion 183 decrypts the contents from the content server 11 received by the receiver portion 62 using the user dedicated decryption key from the authentication portion 182, and supplies the decrypted contents to the decoder 53. The display control portion 54 reads out a user dedicated menu screen from the storage portion 184 based on the person identification data supplied via the encryption portion 183, and displays the read menu screen on the LCD 21. The storage portion 184 stores information about the user dedicated menu screen.

The sender portion 61 sends the content request signal to the content server 11 in response to a user's instruction signal entered via the operation input portion 55. Furthermore, the sender portion 61 sends the person identification data encrypted by the encryption portion 183 to the content server 11. The receiver portion 62 receives the contents sent in from the content server 11 to the encryption portion 183.

Figure 16:
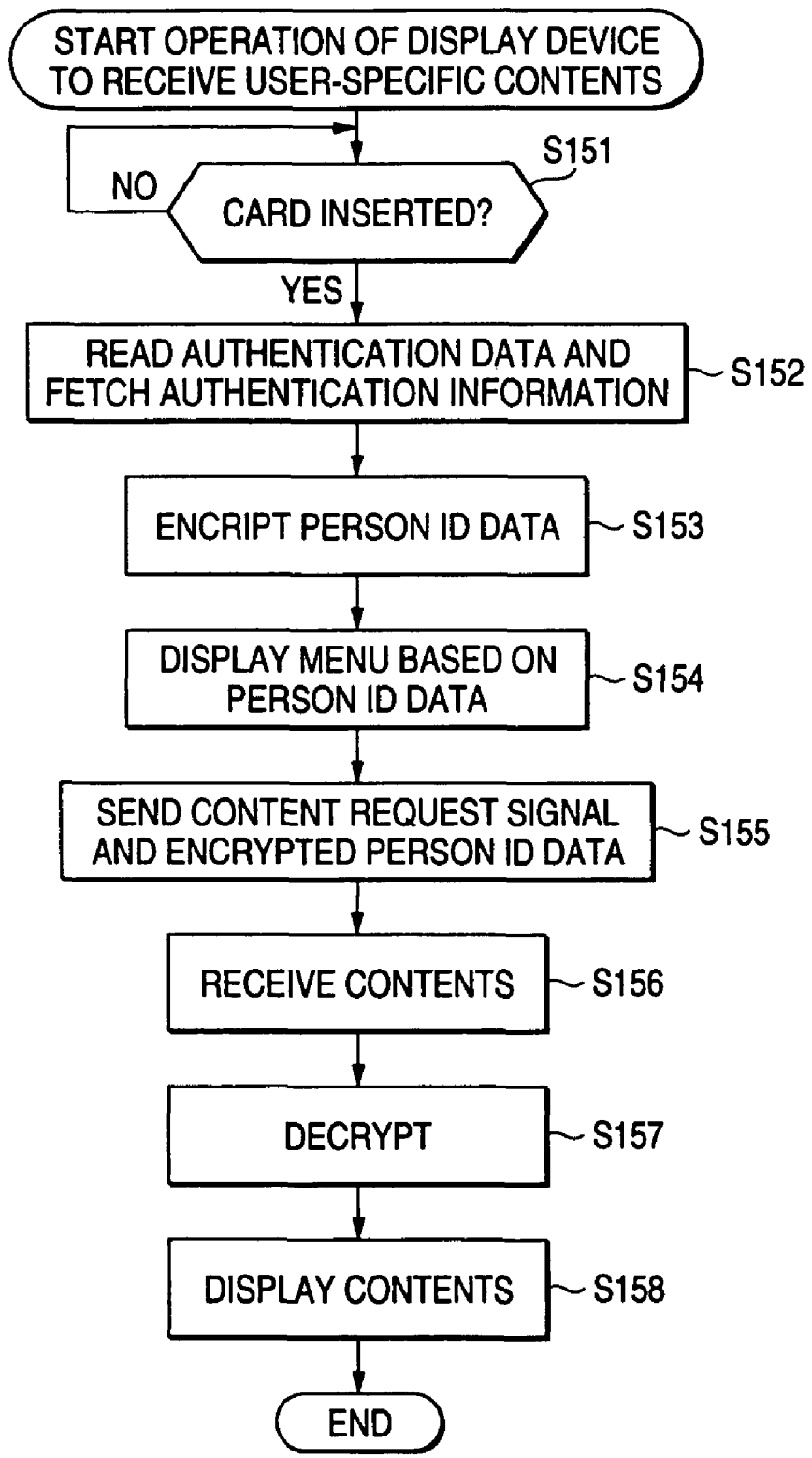
FIG. 16 is a flowchart illustrating processing (operation) of the display device of FIG. 15 to receive user-specific contents.

Processing performed by the display device 12 of FIG. 15 to receive user-specific contents is next described by referring to the flowchart of FIG. 16.

The user inserts his authentication card 171 into the display device 12 to view and listen to the contents of the content server 11 with the display device 12. The card reader 181 of the display device 12 waits until the card 171 is inserted in step S151. If it is determined that the card 171 has been inserted, the display device 12 reads authentication data for authenticating the user from the card 171, supplies the read authentication data to the authentication portion 182, and goes to step S152. In step S152, the authentication portion 182 reads the authentication information about the user (such as person identification data including user dedicated decryption key and user dedicated key creation information 71) from the internal memory based on the authentication data from the card reader 181, supplies the information to the encryption portion 183, and goes to step S153.

In step S153, the encryption portion 183 encrypts the person identification data with the encryption key previously registered in the memory 63 and supplies the encrypted person identification data to the sender portion 61. Then, the encryption portion goes to step S154. At this time, the encryption portion 183 supplies the person identification data to the display control portion 54. The display control portion 54 displays the user-specific menu screen stored in the storage portion 184 on the LCD 21 based on the person identification data supplied from the encryption portion 183 in step S154. Then, the display portion goes to step S155. The previously registered encryption key may also be created by acting on the key creation information 71.

The user views the menu screen displayed on the LCD 21, controls the operation input portion 55, and makes a request of contents that the user wants to view and listen to. Based on the user's operation, the operation input portion 55 supplies the content request signal to the sender portion 61. In step S155, the sender portion 61 sends the content request signal from the operation input portion 55 and the encrypted person identification data from the encryption portion 183 to the content server 11.

Figure 17:
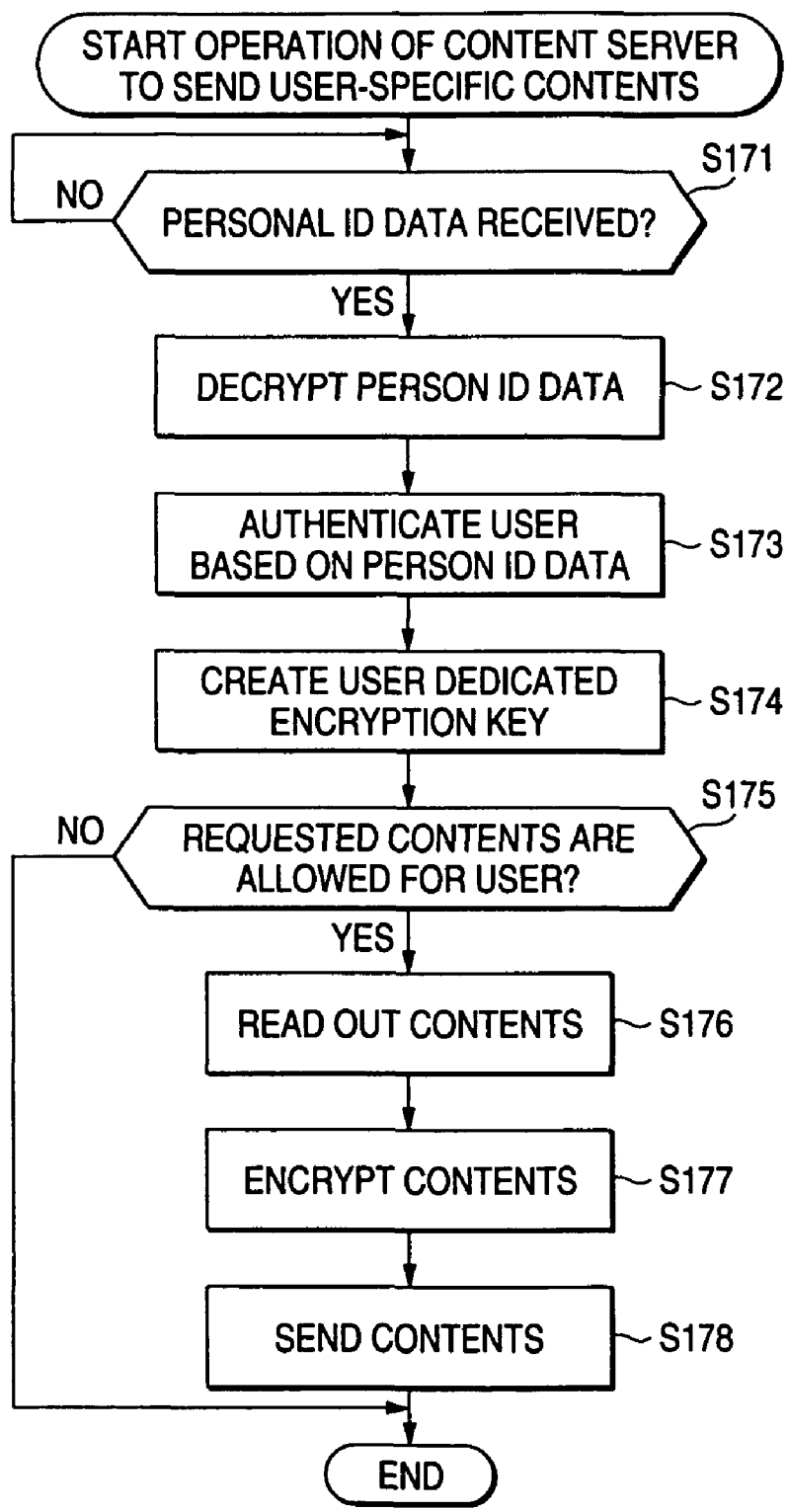
FIG. 17 is a flowchart illustrating processing (operation) of the content server of FIG. 14 to send user-specific contents.

In response to the processing of step S155, the content server 11 encrypts the contents using the user-specific encryption key in step S177 of FIG. 17 (described later). In step S178, the server sends the encrypted contents. The receiver portion 62 receives the contents from the content server 11 in step S156, supplies the contents to the encryption portion 183, and then goes to step S157. The encryption portion 183 decrypts the contents from the receiver portion 62 using the user-specific decryption key, supplies the decrypted contents to the decoder 53, and goes to step S158. In step S158, the decoder 53 decodes the contents decrypted by the decryption portion 52, and supplies the decoded contents to the display control portion 54. The display control portion 54 displays the contents from the decoder 53 on the LCD 21. Thus, the processing for receiving user-specific contents is ended.

Processing of the content server 11 of FIG. 14 to send user-specific contents is executed in a corresponding manner to the aforementioned processing for receiving user-specific contents. This processing for sending user-specific contents is now described by referring to the flowchart of FIG. 17. In the aforementioned step S155 of FIG. 16, the display device 12 sends a content request signal and person identification data. The receiver portion 42 of the server 11 waits until the person identification data from the display device 12 is received in step S171. On receiving the content request signal and person identification data from the display device 12, the receiver portion supplies the content request signal and person identification data to the selection portion 162 and encryption portion 32, respectively. The receiver portion then proceeds to step S172.

In step S172, the encryption portion 32 decrypts the person identification data using the encryption key previously stored in the memory 43, supplies the decrypted person identification data to the authentication portion 161, and proceeds to step S173. The authentication portion 161 authenticates the user based on the person identification data, supplies the results of the authentication and personal identification data to the encryption portion 32 and selection portion 162, and goes to step S174. In step S174, the encryption portion 32 acts on the user-specific key creation information 71 contained in the person identification data based on the results of the authentication of the authentication portion 161, creates a user dedicated encryption key, and proceeds to step S175. The encryption key once created may be stored in the memory 43. In this case, in the next processing run of step S174, the encryption portion 32 reads the user dedicated encryption key from the memory 43 based on the results of authentication of the authentication portion 161.

The selection portion 162 makes a decision in step S175 as to whether readout of the requested contents is limited for the authenticated user or not based on the content request signal from the receiver portion 42 and on the results of the authentication of the user performed by the authentication portion 161, i.e., as to whether the requested contents are allowed for the user or not. If the decision is that the requested contents are allowed for the user, the selection portion goes to step S176, where the selection portion reads the requested contents from the storage portion 33, supplies the read contents to the encryption portion 32, and goes to step S177.

In step S177, the encryption portion 32 encrypts the contents from the selection portion 162 using the created user dedicated encryption key, supplies the encrypted contents to the sender portion 41, and goes to step S178. In step S178, the sender portion 41 sends the contents encrypted by the encryption portion 32 to the display device 12 wirelessly. The processing for sending user-specific contents is ended.

Meanwhile, if the selection portion 162 determines in step S175 that the requested contents are not allowed for the user, it follows that readout of the contents is inhibited by the selection portion 162. Therefore, the processing of steps S176-S178 is skipped. The processing for sending user-specific contents is ended.

Since the user dedicated encryption key is created by acting on the user-specific key creation information 71 in this way, the security of the encryption key is enhanced. In addition, the content server 11 can limit contents read out for each individual user. Alternatively, the image screen displayed on the display device 12 can be made user specific. Consequently, an in-vehicle space complying with user's taste can be offered to the user. Also, contents offered to children can be limited.

In step S153 of FIG. 16, the user-specific menu screen stored in the storage portion 184 is displayed. The menu screen may also be displayed based on information obtained by gaining information about content-limited menu screen based on the person identification data from the content server 11. As a result, the user can no longer indicate unauthorized contents. Hence, it is also possible to restrict contents read out.

In the display device 12 of FIG. 15, user authentication is performed using the card 171. The authentication may also be performed by entering user ID and password.

FIG. 18 shows a still other example of configuration of the content server 11. Like components are indicated by like reference numerals in both FIGS. 2 and 18. Those components which have been already described will not be described below to avoid repetition of the same description. In the content server 11 of FIG. 18, encryption similar to the processing performed by the content server 11 of FIG. 2 may be carried out in a manner not illustrated. This also applies to content server 11 of FIG. 22 (described later) and to display devices of FIGS. 19 and 23.

In the example of FIG. 18, contents read from the storage portion 33 are supplied to a transfer rate converter portion 201. At the beginning of transfer, the transfer rate converter portion 201 directly supplies the contents from the storage portion 33 to the sender portion 41. The converter portion changes the bit rates of the contents from the storage portion 33 according to the priorities of the contents under control of a transfer rate measurement portion 202, and supplies the contents to the sender portion 41.

The transfer rate measurement portion 202 stores the wireless transfer capability possessed by the wireless communication portion 31 (e.g., up to 10 MB in the 802.11b standard). The transfer rate measurement portion 202 measures the transfer rates of the contents supplied to the sender portion 41 from the transfer rate converter portion 201, calculates the total of the measured transfer rates of the contents, and makes a decision as to whether the calculated total of the transfer rates exceeds the wireless transfer capability possessed by the wireless communication portion 31.

The transfer rate measurement portion 202 controls the transfer rate converter portion 201 to reduce the transfer rates (bit rates) of the contents according to the priorities if the measurement portion determines that the total of the transfer rates exceeds the transfer capability possessed by the wireless communication portion 31. That is, contents such as maps used for processing of car navigation are required to have high image quality and achieve high-speed display. Therefore, their priority is high. On the other hand, contents such as movies viewed and listened to on the rear seats are regarded to have lower priority because they are for amusement. Accordingly, the transfer rate converter portion 201 reduces the transfer rate (bit rate) of contents regarded to have low priority from 8 MB to 4 MB, for example, and supplies the contents to the sender portion 41. In the above example, the priorities have been set in advance. The priorities may be set by the user.

The sender portion 41 sends the contents supplied from the transfer rate converter portion 201 to the display device 12. On receiving a content request signal from the display device 12, the receiver portion 42 controls the storage portion 33 to read out the requested contents.

Figure 19:
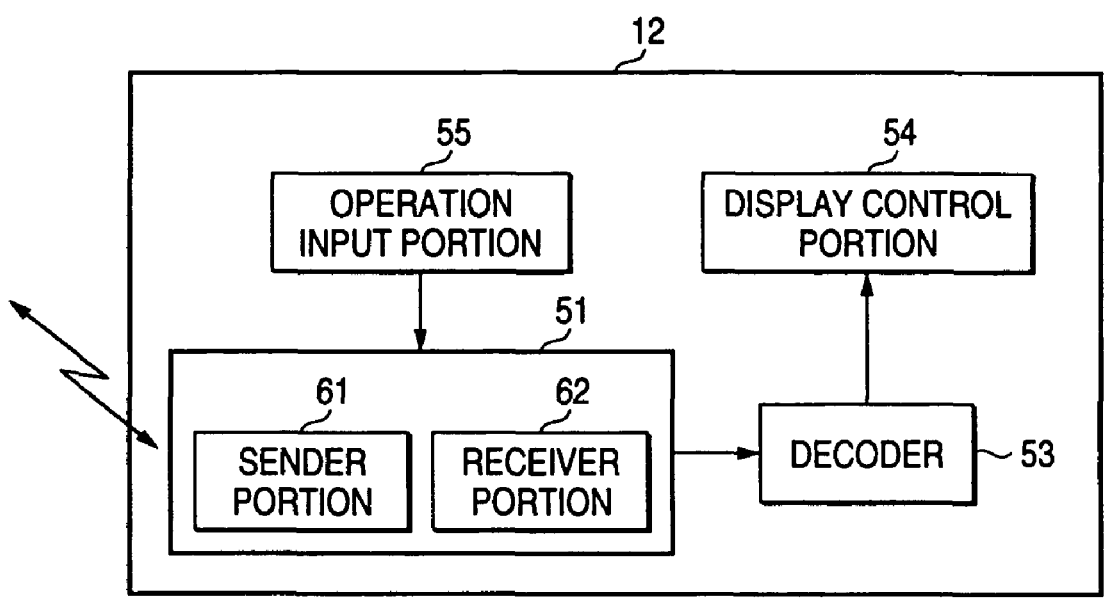
FIG. 19 is a block diagram showing a still other example of configuration of the display device of FIG. 1.

FIG. 19 shows a still other example of configuration of the display device 12. The display device 12 of FIG. 19 is similar in configuration to the display device 12 already described in connection with FIG. 3 except that the decryption portion 52 is omitted. Therefore, the components which have been already described will not be described below to avoid repeated description. In FIG. 19, the decryption portion 52 is omitted. Processing for decryption similar to the processing performed by the content server 11 of FIG. 3 may also be carried out.

In the example of FIG. 19, the sender portion 61 sends a content request signal to the content server 11 based on a user's instruction signal entered via the operation input portion 55. The receiver portion 62 receives the contents sent in from the content server 11 and supplies the contents to the decoder 53.

Figure 20:
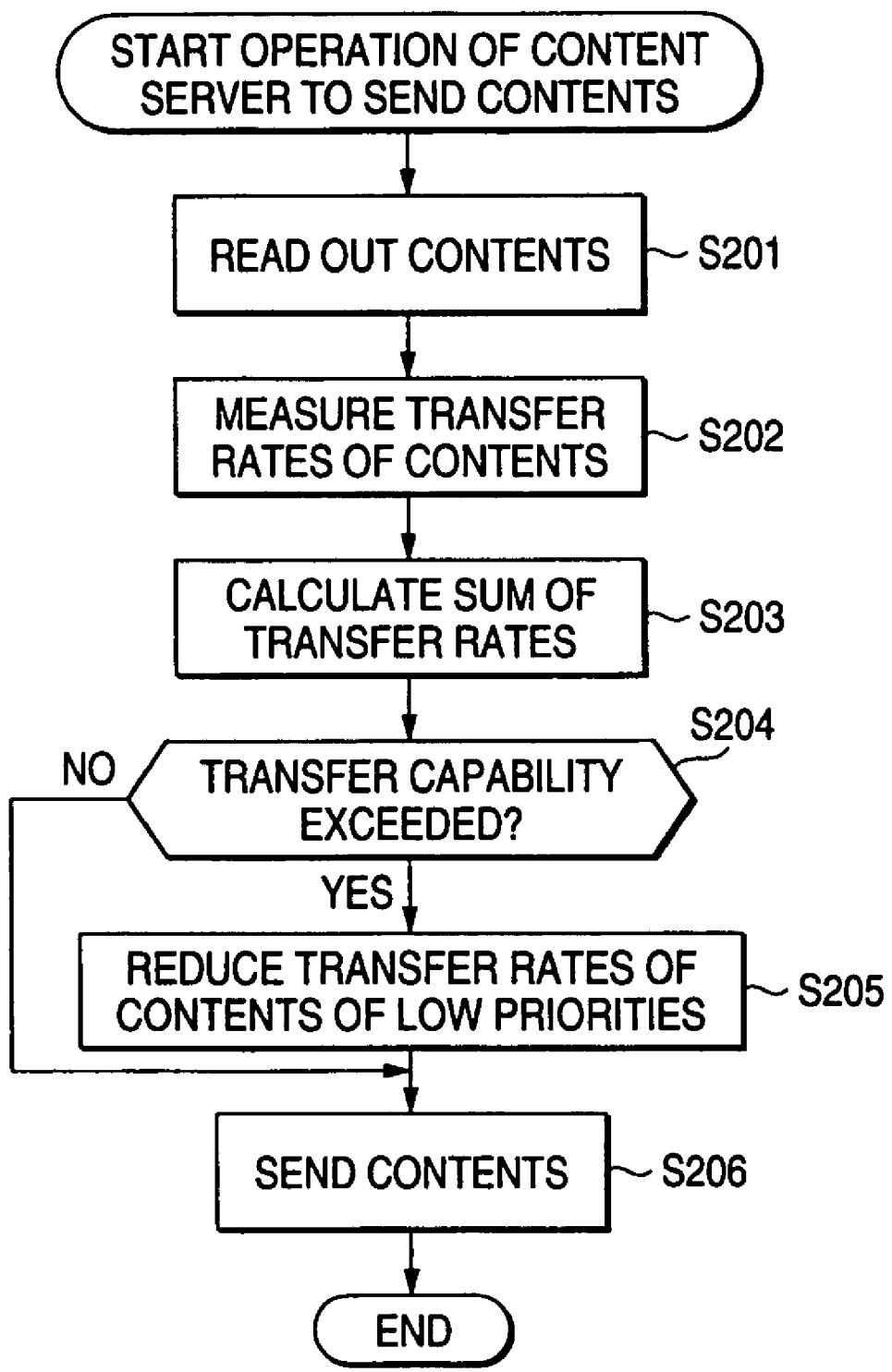
FIG. 20 is a flowchart illustrating processing of the content server of FIG. 18 to send contents.

Processing of the content server 11 of FIG. 18 to send contents is next described by referring to the flowchart of FIG. 20. Since the user manipulates the display device 12 to make a request of contents, the display device 12 sends a content request signal to the content server 11 in step S221 of FIG. 21 described later. Correspondingly, the receiver portion 42 of the content server 11 receives the content request signal and supplies the received request signal to the storage portion 33.

In step S201, the storage portion 33 reads the contents from the storage portion 33 based on the request signal from the receiver portion 42, and supplies the contents to the transfer rate converter portion 201. The storage portion then goes to step S202. Since the sender portion 41 of the wireless communication portion 31 is supplied with the contents read out in the previous processing from the transfer rate converter portion 201, the transfer rate measurement portion 202 measures the transfer rates of the contents supplied to the sender portion 41 in step S202, and goes to step S203, where the measurement portion calculates the total of the measured transfer rates of the contents. Then, the measurement portion goes to step S204.

The transfer rate measurement portion 202 makes a decision in step S204 as to whether the total of the transfer rates calculated in step S203 exceeds the transfer capability of the wireless communication portion 31. If the decision is affirmative (YES), the measurement portion goes to step S205, where the transfer rate converter portion 201 is controlled to reduce the transfer rates. In particular, in step S205, the transfer rate converter portion 201 reduces the transfer rates (bit rates) of contents of low priorities under control of the transfer rate measurement portion 202. The transfer rates of contents of high priorities are maintained constant. In this way, the transfer rates are reduced to below the transfer capability. The transfer rate converter portion 201 supplies the contents of the reduced transfer rates to the sender portion 41 and goes to step S206.

The transfer rate measurement portion 202 skips the processing of step S205 and proceeds to step S206 if the transfer rate measurement portion 202 determines that the calculated total of the transfer rates does not exceed the transfer capability of the wireless communication portion 31 in step S204. That is, in this case, the transfer rate converter portion 201 supplies the contents, which have been read from the storage portion 33, to the sender portion 41 without converting the transfer rates. In step S206, the sender portion 41 wirelessly sends the contents, which have been supplied from the transfer rate converter portion 201, to the display device 12, ending the processing for sending the contents.

Figure 21:
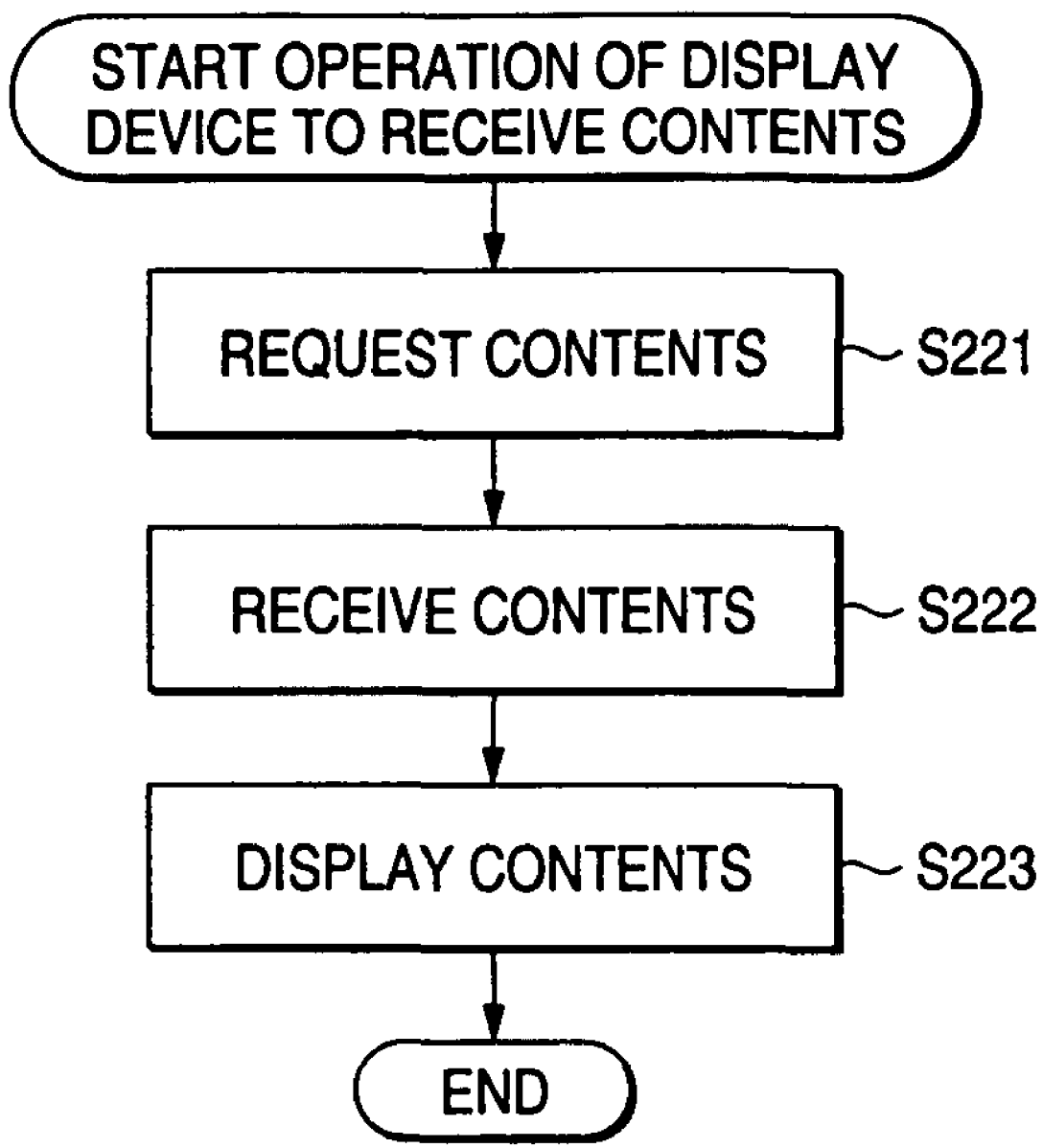
FIG. 21 is a flowchart illustrating processing of the display device of FIG. 19 to receive contents.

Processing of the display device 12 of FIG. 19 to receive contents is next described by referring to the flowchart of FIG. 21, the processing corresponding to the aforementioned processing of the content server 11 to send contents. The user operates the operation input portion 55 to make a request of contents. When the user's content request signal is entered via the operation input portion 55, the sender portion 61 sends the content request signal from the operation input portion 55 to the content server 11 in step S221.

Correspondingly, the content server 11 sends the contents in the aforementioned step S206 of FIG. 20. The receiver portion 62 of the display device 12 receives the contents from the content server 11 in step S222, supplies the received contents to the decoder 53, and proceeds to step S223. In step S223, the decoder 53 decodes the contents supplied from the receiver portion 62 and supplies the decoded contents to the display control portion 54. The display control portion 54 displays the contents from the decoder 53 onto the LCD 21, ending the processing for receiving contents.

As described thus far, the bit rates of contents of lower priorities are reduced according to the transfer capability of the content server 11 and so it is possible to make effective use of the limited wireless bandwidth. Generation of video and audio dropouts is suppressed. Consequently, safety of driving is maintained without impairing any of the image quality of contents and replay speed which are important in executing the processing of the car navigation. Moreover, each individual person can enjoy contents at will.

FIG. 22 shows a still other example of configuration of the content server 11. The content server 11 of FIG. 22 is similar in configuration to the content server 11 already described in connection with FIG. 18 except that a band calculation portion 222 is added and that the transfer rate measurement portion 202 is omitted.

In the example of FIG. 22, the transfer rate converter portion 201 supplies the contents from the storage portion 33 to the sender portion 41 intact at the beginning of transfer. The converter portion modifies the transfer rates (bit rates) of the contents from the storage portion 33 to the sender portion 41 according to the priorities of the contents under control of the band calculation portion 222.

The band calculation portion 222 receives the results of measurements of the amounts of received data from plural display devices 12 via the receiver portion 42, and accumulates the results of measurements of the amounts of received data in real time, the display devices 12 being connected wirelessly. The band calculation portion 222 makes a decision based on the result of the accumulation as to whether the total of the transfer rates of the transferred contents exceeds the wireless transfer capability possessed by the wireless communication portion 31. If it is determined that the total of the transfer rates exceeds the transfer capability possessed by the wireless communication portion 31, transfer rates by which the contents should be reduced are supplied to the transfer rate converter portion 201 in order to reduce the transfer rates of the contents uniformly. Also, in this case, the transfer rates of the contents may be reduced according to the priorities in the same way as in the case of the content server 11 of FIG. 18.

The sender portion 41 sends the contents, which are supplied from the transfer rate converter portion 201, to the display device 12. On receiving a content request signal from the display device 12, the receiver portion 42 controls the storage device 33 to read out the requested contents. The receiver portion 42 receives the results of measurements of the amounts of received data from the display device 12, and supplies the results to the band calculation portion 222.

Figure 23:
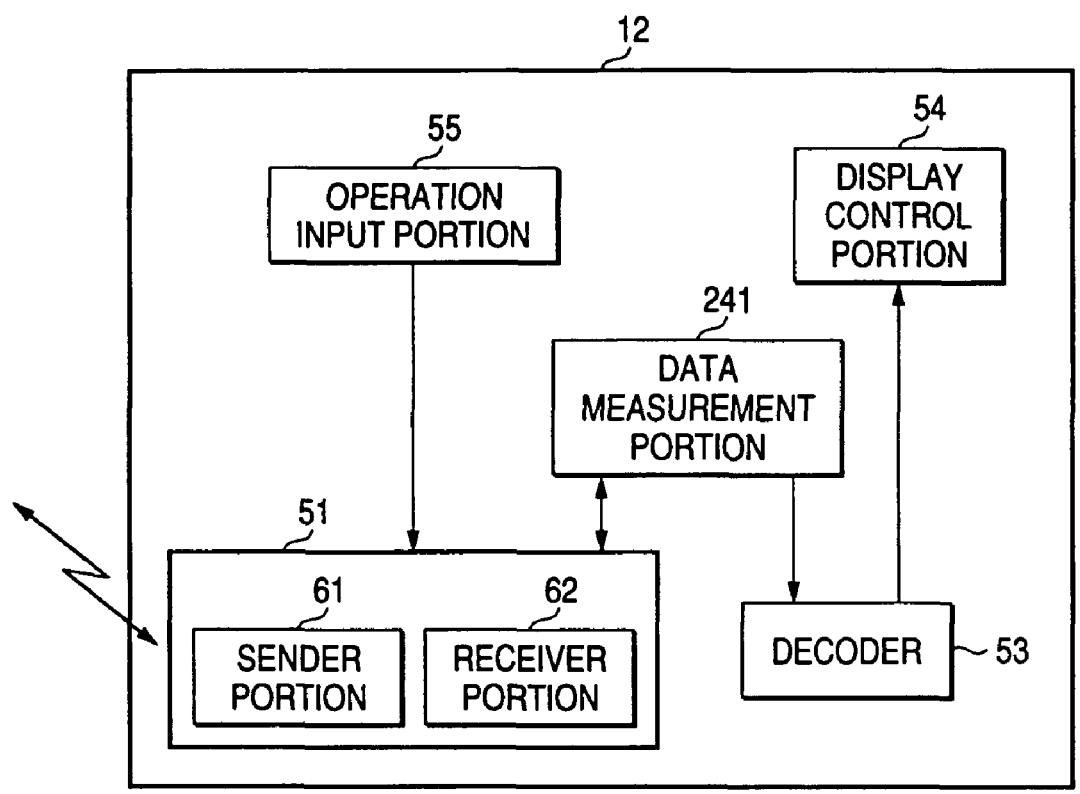
FIG. 23 is a block diagram showing a still further example of configuration of the display device of FIG. 1.

FIG. 23 shows another example of configuration of the display device 12. The display device 12 of FIG. 23 is similar in configuration to the display device 12 already described in connection with FIG. 19 except that a data measurement portion 241 is added.

In the example of FIG. 23, the sender portion 61 sends a content request signal to the content server 11 based on a user's instruction signal entered via the operation input portion 55. Furthermore, the sender portion 61 wirelessly sends the results of measurements of the amounts of received data from the data measurement portion 241 to the content server 11. On receiving the contents from the content server 11, the receiver portion 62 supplies the received contents to the decoder 53 via the data measurement portion 241. The data measurement portion 241 measures the amount of data of the received contents at given intervals (e.g., every 1 second). The contents are supplied to the decoder 53. The data measurement portion 241 supplies the results of the measurements to the amounts of received data to the sender portion 61.

Figure 24:
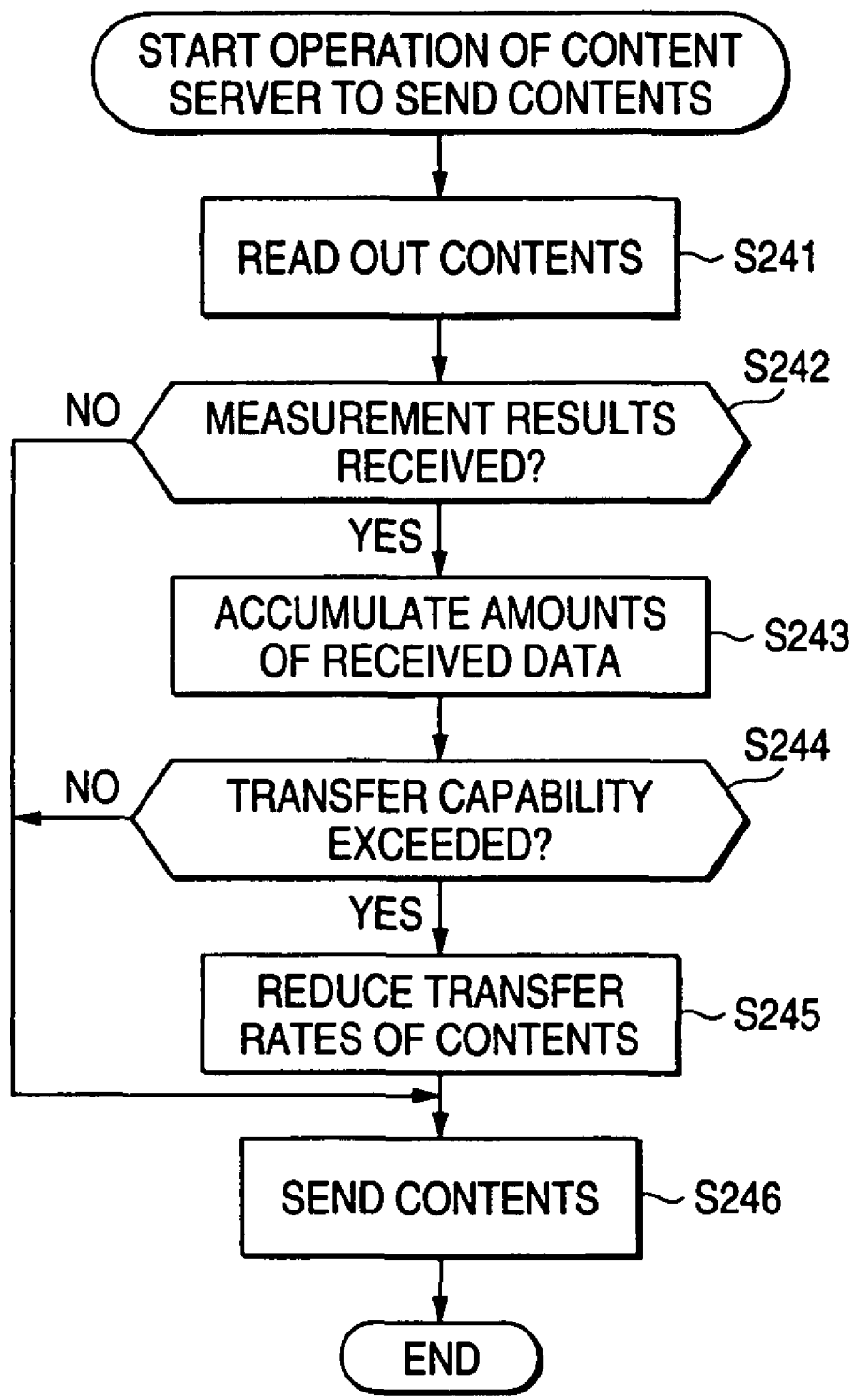
FIG. 24 is a flowchart illustrating processing of the content server of FIG. 22 to send contents.

Processing of the content server 11 of FIG. 22 to send contents is next described by referring to the flowchart of FIG. 24. The user operates the display device 12 and makes a request of contents. Therefore, the display device 12 sends a content request signal to the content server 11 in step S261 of FIG. 25 (described later). Correspondingly, the receiver portion 42 of the content server 11 receives the content request signal and supplies the received request signal to the storage portion 33.

The storage portion 33 reads contents from the storage portion 33 based on the request signal from the receiver portion 42 in step S241, and supplies the contents to the transfer rate converter portion 201. Then, the storage portion goes to step S242. The receiver portion 42 makes a decision as to whether the results of measurements of the amounts of received data have been received from the display devices 12 in step S242. If the decision is that the results of measurements of the amount of received data from the display devices 12 are not received, the processing of steps S243-S245 is skipped. Then, the receiver portion goes to step S246. If the receiver portion 42 determines in step S242 that the results of measurements of the amount of received data from the display devices 12 have been received, the receiver portion supplies the results of measurements of the amount of received data to the band calculation portion 222, and goes to step S243. The band calculation portion 222 accumulates the results of measurements of the amount of received data in real time in step S243, and goes to S244, where the calculation portion makes a decision based on the result of the accumulation as to whether the total of the transfer rates of the transferred contents exceeds the wireless transfer capability possessed by the wireless communication portion 31.

If the band calculation portion 222 determines in step S244 that the total of the transfer rates exceeds the transfer capability possessed by the wireless communication portion 31, the calculation portion supplies transfer rates by which the transfer rates of the contents should be reduced to the transfer rate converter portion 201 in order to reduce the transfer rates of the contents uniformly. Then, the calculation portion goes to step S245. The transfer rate converter portion 201 uniformly reduces the transfer rates of the contents read from the storage portion 33 under control of the band calculation portion 222, supplies the contents of the reduced transfer rates to the sender portion 41, and proceeds to step S246.

In step S244, if the band calculation portion 222 determines that the total of the transfer rates does not exceed the transfer capability of the wireless communication portion 31, the calculation portion skips the processing of step S245 and goes to step S246. That is, in this case, the transfer rate converter portion 201 supplies the contents, which have been read from the storage portion 33, to the sender portion 41 without converting the transfer rates. The sender portion 41 wirelessly sends the contents, which have been supplied from the transfer rate converter portion 201, to the display devices 12 in step S246, and ends the processing for sending the contents.

Figure 25:
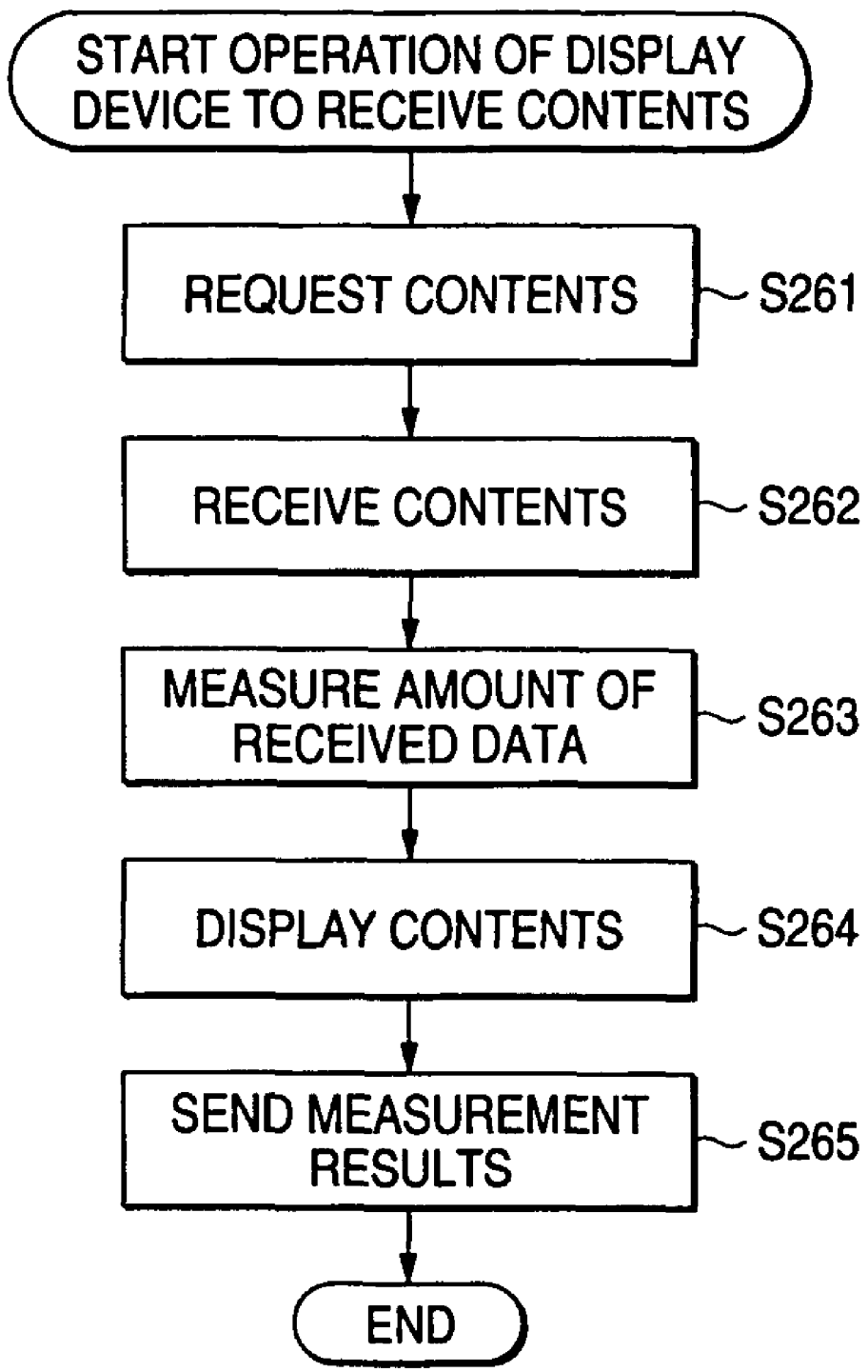
FIG. 25 is a flowchart illustrating processing of the display device of FIG. 23 to receive contents.

Processing of the display devices 12 of FIG. 23 to receive contents is next described by referring to the flowchart of FIG. 25, the processing corresponding to the aforementioned processing of the content server 11. The user operates the operation input portion 55 to make a request of contents. When the user's request signal for contents is entered via the operation input portion 55, the sender portion 61 sends the content request signal from the operation input portion 55 to the content server 11 in step S261.

Correspondingly, the content server 11 sends the contents in the aforementioned step S246 of FIG. 24. The receiver portion 62 of the display device 12 receives the contents from the content server 11 in step S262, supplies the received contents to the data measurement portion 241, and goes to step S263. In step S263, the data measurement portion 241 measures the amount of data of the contents from the receiver portion 62 at regular intervals (e.g., every 1 second), and supplies the contents to the decoder 53. The data measurement portion 241 supplies the result of the measurement of the amount of the received data to the sender portion 61, and goes to step S264.

The decoder 53 decodes the contents supplied from the data measurement portion 241 and supplies the decoded contents to the display control portion 54 in step S264. The display control portion 54 displays the contents from the decoder 53 on the LCD 21 and goes to step S265. In step S265, the sender portion 61 wirelessly sends the results of measurement of the amount of data received from the data measurement portion 241 to the content server 11, and ends the processing for receiving contents.

Since the transfer rates of contents are reduced according to the transfer capability of the content server 11 in this way, it is possible to make effective use of the limited wireless bandwidth. Generation of video and audio dropouts is suppressed.

Furthermore, the display device 12 of FIG. 23 makes a decision based on the results of measurements of the amounts of received data of the contents actually measured by the display device 12 as to whether the amount of data of contents actually transferred exceeds the transfer capability and so the content server 11 of FIG. 18 makes a more reliable decision than where the transfer rates of contents yet to be transferred are measured.

As described so far, the transfer rates (bit rates) of the contents are modified according to the transfer capability of the content server 11 and the priorities of the contents. Accordingly, especially inside of a vehicle, each individual person can enjoy contents at will without lowering any of the image quality of the contents and replay speed which are important in carrying out the processing of car navigation. A comfortable in-vehicle space can be offered to the user. Furthermore, smooth reproduction of contents of maps of a car navigation system as described thus far leads to enhancement of the safety of driving.

In the above description, wirelessly connected devices are content server and display devices. The wirelessly connected devices are not limited to them. The wireless connected devices may include audio devices, personal computer, PDA (personal digital assistant), and digital camera.

Furthermore, in the above description, wireless communications are stipulated by IEEE802.11b. Any communication can be used as long as it uses electromagnetic waves capable of being transferred between devices installed inside a vehicle. The invention can also be applied to relatively short-range wireless communications such as Bluetooth® communications. In addition, in the above description, the inside of a vehicle is the interior of a private car. Of course, the invention can be applied to buses, streetcars, and so on. Furthermore, of course, within the communicable range of the used wireless technology, the invention can be applied to communications between devices installed inside a vehicle and an external device close to the vehicle.

The sequence of processing steps described above can be executed by hardware. It can also be implemented by software. In this case, the content server 11 of FIGS. 2, 8, 10, 14, 18, and 22 and the display devices 12 of FIGS. 3, 9, 11, 15, 19, and 23 are made of an information processor 301 as shown in FIG. 26.

Figure 26:
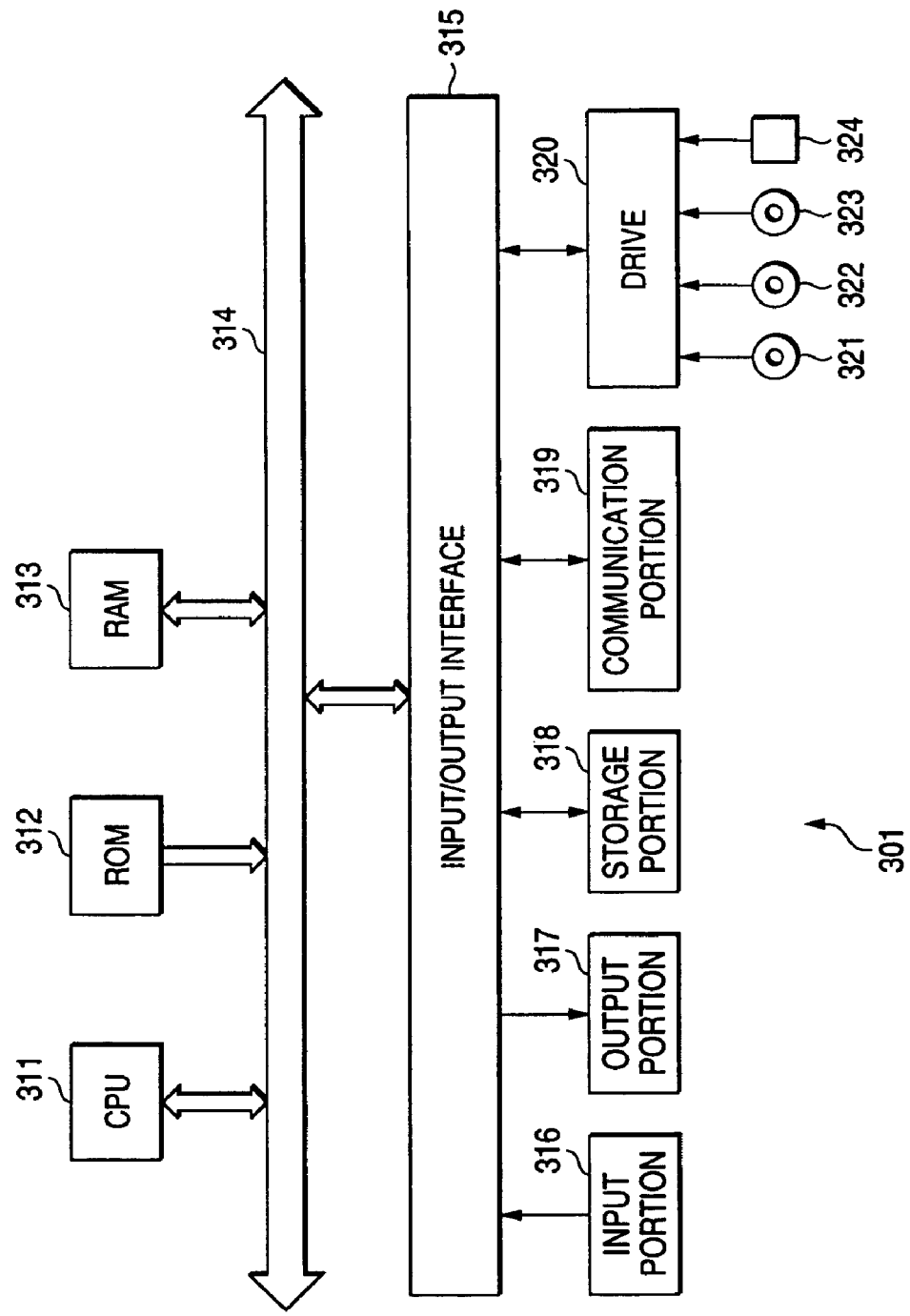
FIG. 26 is a block diagram showing an example of configuration of an information processor according to the present invention.

In FIG. 26, a CPU (central processing unit) 311 executes various kinds of processing according to a program stored in a ROM (read-only memory) 312 or a program loaded in a RAM (random access memory) 313 from a storage portion 318. Data necessary for the CPU 311 in executing various kinds of processing are appropriately stored in the RAM 313.

The CPU 311, ROM 312, and RAM 313 are interconnected via a bus 314. An input/output interface 315 is also connected with the bus 314.

An input portion 316 consisting of a keyboard, a mouse, and so on, a display device such as a CRT (cathode-ray tube) or LCD (liquid-crystal display), an output portion 317 made of speakers, the storage portion 318 made of a hard disk or the like, and a communication portion 319 made of a modem, terminal adapter, or the like are connected with the input/output interface 315. The communication portion 319 performs processing for communications via a network such as wireless network.

If necessary, a drive 320 is connected with the input/output interface 315. A magnetic disk 321, an optical disk 322, a magnetooptical disk 323, or a semiconductor memory 324 is appropriately mounted. A computer program read from it is installed in the storage portion 318 as the need arises.

Where a sequence of processing steps is implemented by software, a program forming the software is installed from a network or recording medium into a computer mounted in dedicated hardware or into a general-purpose personal computer capable of performing various functions by installing various programs.

As shown in FIG. 26, this recording medium is made of a packaged medium distributed to offer programs to users, apart from the device body. Examples of this packaged medium on which programs are recorded include the magnetic disk 321 (including flexible disk), optical disk 322 (CD-ROM (compact disk read-only memory) or DVD (digital versatile disk)), magnetooptical disk 323 (MD (Mini-Disk (trademark)), and semiconductor memory 324. In addition, the recording medium can be made of the ROM 312 in which programs have been recorded or a hard disk contained in the storage portion 318. The recording medium is previously mounted in the device body and offered to users.

Of course, the steps shown in the flowchart in the present specification form processing steps carried out in a timed sequence, i.e., in the described order. The processing steps are not always required to be carried out in a timed sequence. They may also be performed in parallel or individually.

It is to be understood that in the present specification, a system indicates the whole apparatus made up of plural devices.

According to the present invention, a network can be used securely and favorably within a vehicle. Furthermore, according to the invention, a network can be used efficiently in a manner adapted to the in-vehicle environment.

What is claimed is:

1. An in-vehicle communication system consisting of first and second communication terminals connected with a wireless network, wherein said first communication terminal comprises: a content readout unit reading contents required by said second communication terminal; a content encryption unit encrypting the contents read by said content readout unit using a first key acted on by identification information about a vehicle; a content transmission unit sending the contents encrypted by said content encryption unit to said second communication terminal, the contents including movies and music for distribution within the vehicle, a calculation unit calculating the total of transfer rates of contents communicated with said second communication terminal, a capability decision unit making a decision as to whether said total of transfer rates calculated by said calculation unit exceeds a transfer capability of said wireless network, and a transfer rate change unit changing the transfer rates of the contents sent by said content transmission unit according to priorities of said contents in a case where said capability decision unit has determined that the total of the transfer rates has exceeded the transfer capability of said wireless network, and wherein said second communication terminal comprises: a content reception unit receiving the contents sent by said first communication terminal; a content decryption unit decrypting the contents received by said content reception unit using said first key; and an output control unit controlling outputting of the contents decrypted by said content decryption unit and wherein said content reception unit of said second communication terminal receives said first key when a decision is made that said first communication terminal is located within a predetermined short distance; and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

2. An in-vehicle communication system as set forth in claim 1, wherein said first communication terminal further includes: an identification information reception unit receiving said identification information sent from said second communication terminal; a creation unit creating said first key by acting on said identification information received from said identification information reception unit; and a key transmission unit sending said first key created by said creation unit to said second communication terminal, and wherein said second communication terminal further includes: an input unit entering said identification information based on a user's operation; an input decision unit making a decision as to whether transmission of said identification information entered by said input unit has been commanded; a position decision unit making a decision as to whether said first communication terminal is located within a given close range; an identification information transmission unit sending said identification information to said first communication terminal in a case where said input decision unit has determined that transmission of said identification information has been commanded and, at the same time, said position decision unit has determined that said first communication terminal is located in the given close range; and a key reception unit far-receiving said first key sent in from said first communication terminal.

3. An in-vehicle communication system as set forth in claim 1, wherein said first communication terminal further includes an identification information storage unit previously storing said identification information and a first creation unit creating said first key by acting on said identification information stored in said identification information storage unit, and wherein said second communication terminal further includes an input unit entering said identification information based on a user's operation and a second creation unit creating said first key by acting on said identification information entered by said input unit.

4. An in-vehicle communication system as set forth in claim 1, wherein said first communication terminal further includes a first key storage unit previously storing a second key used for encryption, an identification information decryption unit decrypting said identification information from said second communication terminal using said second key, and a first rewriting unit rewriting said second key stored in said first key storage unit into said first key acted on by said identification information decrypted by said identification information decryption unit, wherein said second communication terminal further includes a second key storage unit previously storing said second key, an input unit entering said identification information based on a user's operation, an identification information encryption unit encrypting said identification information entered by said input unit using said second key, an identification information transmission unit sending said identification information encrypted by said identification information encryption unit to said first communication terminal, and a second rewriting unit rewriting said second key stored in said key storage unit into said first key acted on by said identification information entered by said input unit, and wherein said content encryption unit and content decryption unit process said contents using said second key before said second key is rewritten into said first key by said first and second rewriting units and process said contents using said first key after said second key has been rewritten into said first key by said first and second rewriting units.

5. An in-vehicle communication system as set forth in claim 1, wherein said first communication terminal further includes a user identification information reception unit receiving said identification information from said second communication terminal, said identification information being user-specific information, a creation unit creating said first key by acting on said user-specific identification information received by said user identification information reception unit, and a content limitation unit limiting contents read out by said content readout unit based on said user-specific identification information received by said user identification information reception unit, and wherein said second communication terminal further includes a user information readout unit reading user's information from a recording medium installed in the second communication terminal itself, an identification information readout unit reading said user-specific identification information from a memory based on said user's information read out by said user information readout unit, and an identification information transmission unit sending said user-specific identification information read out by said identification information readout unit to said first communication terminal.

6. An in-vehicle communication system as set forth in claim 1, wherein said first communication terminal further includes a volume measurement unit measuring data volume of the contents sent by said content transmission unit, and wherein said calculation unit calculates the total of transfer rates of the contents communicated with said second communication terminal based on information about said data volume measured by said volume measurement unit.

7. An in-vehicle communication system as set forth in claim 1, wherein said first communication terminal further includes a data information reception unit receiving information about said data volume sent from said second communication terminal, wherein said calculation unit calculates the total of transfer rates of the contents communicated with said second communication terminal based on the information about said data volume received by said data information reception unit, and wherein said second communication terminal further includes a volume measurement unit measuring data volume of the contents received by said content reception unit and a data information transmission unit sending information about said data volume measured by said volume measurement unit to said first communication terminal.

8. A communication method for an in-vehicle communication system consisting of first and second communication terminals connected with a wireless network, wherein said first communication terminal performs communications by reading out contents required by said second communication terminal, encrypting said read contents using a key acted on by identification information about a vehicle, sending the encrypted contents to said second communication terminal, the contents including movies and music for distribution within the vehicle, calculating the total transfer rates of contents communicated with said second communication terminal, making a decision as to whether the calculated total of transfer rates exceeds a transfer capability of said wireless network, and changing the transfer rates of sending the encrypted contents to said second communication terminal according to priorities of said contents in a case where the calculated total of the transfer rates is determined to exceed the transfer capability of said wireless network, and wherein said second communication terminal performs communications by receiving the contents sent from said first communication terminal, decrypting the received contents using said key, and controlling outputting of the decrypted contents and wherein said second communication terminal receives said key when a decision is made that said first communication terminal is located within a predetermined short distance; and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

9. An in-vehicle communication terminal for performing communications with a different second in-vehicle communication terminal connected with a wireless network, the first-mentioned in-vehicle communication terminal comprising:
a content readout unit reading out contents required by said second in-vehicle communication terminal, the contents including movies and music for distribution within the vehicle;
a content encryption unit encrypting the contents read out by said content readout unit using a first key acted on by identification information about a vehicle;
a content transmission unit sending the contents encrypted by said content encryption unit to said second in-vehicle communication terminal;
a calculation unit calculating the total of transfer rates of contents communicated with said second in-vehicle communication terminal;
a capability decision unit making a decision as to whether the total of transfer rates calculated by said calculation unit has exceeded a transfer capability of said wireless network; and
a transfer rate change unit changing the transfer rates of the contents sent by said content transmission unit according to priorities of said contents in a case where said capability decision unit has determined that the total of the transfer rates has exceeded the transfer capability of said wireless network, wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's license number.

10. An in-vehicle communication terminal as set forth in claim 9, further including:
an identification information reception unit for receiving said identification information sent from said second in-vehicle communication terminal located within a given close range;
a creation unit creating said first key based on said identification information received by said identification information reception unit; and
a key transmission unit sending said first key created by said creation unit to said second in-vehicle communication terminal.

11. An in-vehicle communication terminal as set forth in claim 9, further including:
an identification information storage unit for previously storing said identification information; and
a creation unit creating said first key based on said identification information stored in said identification information storage unit.

12. An in-vehicle communication system as set forth in claim 9, further including:
a key storage unit previously storing a second key used for encryption;
an identification information reception unit for receiving said identification information which has been encrypted using said second key by said second in-vehicle communication terminal and which has been sent;
an identification information decryption unit decrypting said identification information, which has been received by said identification information reception unit, using said second key; and
a rewriting unit rewriting said second key stored in said key storage unit into said first key acted on by said identification information decrypted by said identification information decryption unit;
wherein said content encryption unit encrypts said contents using said second key before said second key is rewritten into said first key by said rewriting unit and encrypts said contents using said first key after said second key has been rewritten into said first key by said rewriting unit.

13. An in-vehicle communication terminal as set forth in claim 9, further including:
a user identification information reception unit receiving said identification information from said second in-vehicle communication terminal, said identification information being user-specific information;
a creation unit creating said first key by acting on said user-specific identification information received by said user identification information reception unit; and a content limitation unit for limiting contents read out by said content readout unit based on said user-specific identification information received by said user identification information reception unit.

14. An in-vehicle communication terminal as set forth in claim 9, wherein there is further provided a volume measurement unit measuring data volume of the contents sent by said content transmission unit, and wherein said calculation unit calculates the total of the transfer rates of the contents communicated with said second in-vehicle communication terminal based on information about said data volume measured by said volume measurement unit.

15. An in-vehicle communication terminal as set forth in claim 9, wherein there is further provided a data information reception unit for receiving information about data volume of said contents which are measured by said second in-vehicle communication terminal and which are sent, said second in-vehicle communication terminal receiving the contents sent by said content transmission unit, and
wherein said calculation unit calculates the total of the transfer rates of the contents communicated with said second in-vehicle communication terminal based on information about said data volume received by said data information reception unit.

16. A communication method for a first in-vehicle communication terminal for performing communications with a different second in-vehicle communication terminal connected with a wireless network, said method comprising the steps of:
reading out contents required by said second in-vehicle communication terminal, the contents including movies and music for distribution within the vehicle;
encrypting the read contents using a key acted on by identification information about a vehicle;
sending the encrypted contents to said second in-vehicle communication terminal;
calculating the total transfer rates of contents communicated with said second communication terminal;
making a decision as to whether the calculated total of transfer rates exceeds a transfer capability of said wireless network; and
changing the transfer rates of sending the encrypted contents to said second communication terminal according to priorities of said contents in a case where the calculated total of the transfer rates is determined to exceed the transfer capability of said wireless network,
wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

17. A non-transitory program recording medium on which a program for causing a computer in a first in-vehicle communication terminal to perform processing for performing communications with a second in-vehicle communication terminal connected with a wireless network, said program comprising the steps of:
reading out contents required by said second in-vehicle communication terminal, the contents including movies and music for distribution within the vehicle;
encrypting the read contents using a key acted on by identification information about a vehicle;
sending the encrypted contents to said second in-vehicle communication terminal;
calculating the total transfer rates of contents communicated with said second communication terminal;
making a decision as to whether the calculated total of transfer rates exceeds a transfer capability of said wireless network; and
changing the transfer rates of sending the encrypted contents to said second communication terminal according to priorities of said contents in a case where the calculated total of the transfer rates is determined to exceed the transfer capability of said wireless network,
wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

18. A non-transitory program for causing a computer in a first in-vehicle communication terminal to perform processing for performing communications with a second in-vehicle communication terminal connected with a wireless network, said program comprising the steps of:
reading out contents required by said second in-vehicle communication terminal, the contents including movies and music for distribution within the vehicle;
encrypting the read contents using a key acted on by identification information about a vehicle;
sending the encrypted contents to said second in-vehicle communication terminal;
calculating the total transfer rates of contents communicated with said second communication terminal;
making a decision as to whether the calculated total of transfer rates exceeds a transfer capability of said wireless network; and
changing the transfer rates of sending the encrypted contents to said second communication terminal according to priorities of said contents in a case where the calculated total of the transfer rates is determined to exceed the transfer capability of said wireless network,
wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

19. An in-vehicle communication terminal for performing communications with a different second in-vehicle communication terminal connected with a wireless network, the first-mentioned in-vehicle communication terminal comprising:

a content reception unit receiving contents, which have been encrypted using a first key and which have been sent by said second in-vehicle communication terminal, the first key being acted on by identification information about a vehicle, the contents including movies and music for distribution within the vehicle, wherein said first in-vehicle communication terminal receives said first key when a decision is made that said second in-vehicle communication terminal is located within a predetermined short distance;

a content decryption unit decrypting the contents received by said content reception unit using said first key;

an output control unit controlling outputting of the contents decrypted by said content decryption unit;

a volume measurement unit measuring data volume of contents received by said content reception unit; and a data information transmission unit sending information about said data volume measured by said volume measurement unit to said second in-vehicle communication terminal, wherein said content reception unit receives contents whose transfer rates have been changed based on the information about said data volume by said second in-vehicle communication terminal, and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's license number.

20. An in-vehicle communication terminal as set forth in claim 19, further including:

an input unit entering said identification information based on a user's operation;

an input decision unit making a decision as to whether transmission of said identification information entered by said input unit has been commanded or not;

a position decision unit making a decision as to whether said second in-vehicle communication terminal is located within a given close range;

an identification information transmission unit sending said identification information to said second in-vehicle communication terminal in a case where said input unit decision unit has determined that transmission of said identification information has been commanded and, at the same time, said position decision unit has determined that said second in-vehicle communication terminal is located within the given close range; and a key reception unit receiving said first key which has been created by acting on said identification information by means of said second in-vehicle communication terminal and which has been sent.

21. An in-vehicle communication terminal as set forth in claim 19, further including:

an input unit entering said identification information based on a user's operation; and a creation unit creating said first key based on said identification information entered by said input unit.

22. An in-vehicle communication terminal as set forth in claim 19, further including:

a key storage unit previously storing a second key used for encryption;

an input unit entering said identification information based on a user's operation;

an identification information encryption unit encrypting said identification information, which has been entered by said input unit, using said second key;

an identification information transmission unit sending said identification information encrypted by said identification information encryption unit to said second in-vehicle communication terminal; and a rewriting unit rewriting said second key stored in said key storage unit into said first key acted on by said identification information entered by said input unit;

wherein said content decryption unit decrypts said contents using said second key before said second key is rewritten into said first key by said rewriting unit and decrypts said contents using said first key after said second key has been rewritten into said first key by said rewriting unit.

23. An in-vehicle communication terminal as set forth in claim 19, further including:

a user information readout unit reading user's information from a recording medium mounted in the present in-vehicle communication terminal;

an information readout unit reading said identification information from a memory based on said user's information read out by said user information readout unit, said identification information being user-specific information used for identifying the user; and an identification information transmission unit for sending said user-specific identification information read out by said information readout unit to said second in-vehicle communication terminal;

wherein said content reception unit receives only contents whose readouts are not limited as a result of authentication performed by said second in-vehicle communication terminal based on said user-specific identification information.

24. A communication method for a first in-vehicle communication terminal for performing communications with a different second in-vehicle communication terminal connected with a wireless network, said communication method comprising the steps of:

receiving contents which have been encrypted by said second in-vehicle communication terminal using a key acted on by identification information about a vehicle and which have been sent, the contents including movies and music for distribution within the vehicle, said first in-vehicle communication terminal receiving said key when a decision is made that said second in-vehicle communication terminal is located within a predetermined short distance;

decrypting the received contents using said key;

controlling outputting of the decrypted contents;

measuring a data volume of the received contents; and sending information about the measured data volume to said second in-vehicle communication terminal, wherein said first in-vehicle communication terminal receives contents whose transfer rates have been changed by said second in-vehicle communication terminal based on the measured data volume, and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's license number.

25. A non-transitory program recording medium on which a program is recorded, the program being used to cause a computer in a first in-vehicle communication terminal to perform processing for performing communications with a second in-vehicle communication terminal connected with a wireless network, said program comprising the steps of:

receiving contents which have been encrypted by said second in-vehicle communication terminal using a key acted on by identification information about a vehicle and which have been sent, the contents including movies and music for distribution within the vehicle, said first in-vehicle communication terminal receiving said key when a decision is made that said second in-vehicle communication terminal is located within a predetermined short distance;

decrypting the received contents using said key;

controlling outputting of the decrypted contents;

measuring a data volume of the received contents; and sending information about the measured data volume to said second in-vehicle communication terminal, wherein said first in-vehicle communication terminal receives contents whose transfer rates have been changed by said second in-vehicle communication terminal based on the measured data volume, and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's license number.

26. A non-transitory program for causing a computer in a first in-vehicle communication terminal to perform processing for performing communications with a second in-vehicle communication terminal connected with a wireless network, said program comprising the steps of:

receiving contents which have been encrypted by said second in-vehicle communication terminal using a key acted on by identification information about a vehicle and which have been sent, the contents including movies and music for distribution within the vehicle, said first in-vehicle communication terminal receiving said key when a decision is made that said second in-vehicle communication terminal is located within a predetermined short distance;

decrypting the received contents using said key;

controlling outputting of the decrypted contents measuring a data volume of the received contents; and sending information about the measured data volume to said second in-vehicle communication terminal, wherein said first in-vehicle communication terminal receives contents whose transfer rates have been changed by said second in-vehicle communication terminal based on the measured data volume, and wherein the first communication terminal and the second communication terminal are installed within a vehicle, and the first communication terminal communicates with the second communication terminal within the vehicle to provide secure, in-vehicle wireless content distribution, wherein the second communication terminal is installed within the vehicle behind the driver or passenger seat of the vehicle to permit users on the rear seats of the vehicle to view and listen to the movies and music and wherein said identification information is a production number of the vehicle, a plate number of the vehicle, an engine key number, or a user's driver's number.

* * * * *